(12) United States Patent
Messner et al.

(10) Patent No.: US 12,258,945 B2
(45) Date of Patent: Mar. 25, 2025

(54) BALANCED GEOTHERMAL ENERGY TRANSFER LOOP

(71) Applicant: Novus Earth Energy Operations Inc., Calgary (CA)

(72) Inventors: Jeffery Ernst Messner, Calgary (CA); Ralph Melvin Salm, Red Deer (CA); Navneet Sira, Calgary (CA)

(73) Assignee: Novus Earth Energy Operations Inc., Calgary (CA)

( * ) Notice: Subject to any disclaimer, the term of this patent is extended or adjusted under 35 U.S.C. 154(b) by 0 days.

(21) Appl. No.: 18/245,812

(22) PCT Filed: Feb. 6, 2023

(86) PCT No.: PCT/CA2023/050146
§ 371 (c)(1),
(2) Date: Mar. 17, 2023

(87) PCT Pub. No.: WO2023/147670
PCT Pub. Date: Aug. 10, 2023

(65) Prior Publication Data
US 2024/0301874 A1    Sep. 12, 2024

Related U.S. Application Data

(60) Provisional application No. 63/306,555, filed on Feb. 4, 2022.

(51) Int. Cl.
*F03G 4/00* (2006.01)
*F24T 10/00* (2018.01)
*F24T 10/10* (2018.01)

(52) U.S. Cl.
CPC .............. *F03G 4/029* (2021.08); *F24T 10/10* (2018.05); *F24T 2010/50* (2018.05)

(58) Field of Classification Search
CPC ........ F03G 4/029; F24T 10/10; F24T 2010/50
(Continued)

(56) References Cited

U.S. PATENT DOCUMENTS

| 4,844,164 A | 7/1989 | Shen |
| 11,434,740 B1 * | 9/2022 | Ngyuen ................. E21B 43/26 |

(Continued)

FOREIGN PATENT DOCUMENTS

| CA | 2998782 A1 | 10/2018 |
| CA | 3038294 A1 | 6/2019 |

(Continued)

OTHER PUBLICATIONS

International Patent Application No. PCT/CA2023/050146, International Search Report and Written Opinion, dated May 4, 2023.

*Primary Examiner* — Hoang M Nguyen
(74) *Attorney, Agent, or Firm* — Borden Ladner Gervais LLP; Geoffrey deKleine

(57) ABSTRACT

A system and method for geothermal heat production. A balanced geothermal energy transfer loop includes a first wellbore and a second wellbore extending from surface to a subterranean geothermal formation and a plurality of balanced open hole circuits extending between the first wellbore and the second wellbore through the geothermal formation, forming a substantially sealed closed loop. Each of the plurality of circuits is designed or modified to have a substantially equal circuit parameter. The circuit parameter may include one or more of circuit fluid velocity, circuit pressure drop, circuit volume and/or circuit length. The circuit parameter may include circuit length and volume, and the circuits connect the supply/return wells in a first out/last in configuration.

18 Claims, 26 Drawing Sheets

(58) Field of Classification Search
USPC .............................................. 60/641.2–641.4
See application file for complete search history.

(56) References Cited

U.S. PATENT DOCUMENTS

| | | | |
|---|---|---|---|
| 2018/0330245 A1 | 11/2018 | Cohen | |
| 2020/0011151 A1 | 1/2020 | Toews et al. | |
| 2020/0049380 A1* | 2/2020 | Cairns | F24T 10/13 |
| 2020/0217181 A1 | 7/2020 | Norbeck et al. | |
| 2020/0408041 A1* | 12/2020 | Riddell | F24T 10/00 |
| 2021/0003320 A1* | 1/2021 | Toews | E21B 33/13 |
| 2021/0004592 A1 | 1/2021 | Griffel et al. | |
| 2021/0142537 A1 | 5/2021 | Abi-Rached et al. | |
| 2021/0166019 A1 | 6/2021 | White et al. | |
| 2023/0228155 A1* | 7/2023 | Toews | E21B 43/261 |
| | | | 175/67 |

FOREIGN PATENT DOCUMENTS

| | | |
|---|---|---|
| CA | 3100013 A1 | 8/2021 |
| CN | 103362442 A | 10/2013 |
| CN | 108222831 A | 6/2018 |
| WO | 2014182628 A2 | 11/2014 |
| WO | 2020113914 A1 | 6/2020 |

\* cited by examiner

BALANCED GEOTHERMAL ENERGY TRANSFER LOOP

CROSS REFERENCE TO RELATED APPLICATIONS

This application claims the benefit of and priority to U.S. Provisional Patent Application No. 63/306,555, filed on Feb. 4, 2022, the entirety of which is hereby incorporated by reference.

FIELD

The present disclosure relates generally to geothermal energy and geothermal wells. More particularly, the present disclosure relates to advanced, closed-loop, geothermal energy and geothermal wells.

BACKGROUND

Energy extraction from conventional geothermal wells is reliant on tapping into a hot aquifer below the surface of the earth. A problem is that hot aquifers are not readily accessible.

Enhanced geothermal wells are placed in a subsurface formation that has a low porosity and permeability and then fractured (or "fracked") to increase permeability in an effort to enhance flow rates within an aquifer. A problem is that formation fracturing can cause induced seismicity and significant water losses may occur.

Advanced geothermal systems, such as a closed-loop configuration, allows for dispatchability in any formation that has heat and does not require accessing an aquifer formation. However, attempts to implement closed loop designs have had marginal success due to the configuration of the downhole loop designs currently being tested.

It is, therefore, desirable to provide an improved advanced geothermal well configuration and/or closed-loop.

SUMMARY

It is an object of the present disclosure to obviate or mitigate at least one disadvantage of previous geothermal well and/or closed-loop designs.

Using a balanced flow design, the amount of extractable thermal energy may be increased in contrast to an unbalanced flow design. A balanced system provides substantially equal flow rates through the horizontal circuits, without the increased pumping penalties. An unbalanced system presents varying challenges which may arise from unequal flow rates. For example: increased pumping penalties, varying thermal transfer capabilities across the circuits and no viable means of calculating the thermal transmission as it pertains to exposed surface within the loop.

A balanced flow may allow for a significant increase in thermal transfer from the formation to the well.

In a first aspect, the present disclosure provides a system including a first wellbore extending from a surface to a subterranean geothermal formation, the first wellbore comprising a lateral section in the subterranean formation; a second wellbore extending from the surface to the subterranean geothermal formation, the second wellbore comprising a lateral section in the subterranean geothermal formation; a plurality of open hole circuits extending between the lateral section of the first wellbore and the lateral section of the second wellbore; wherein the first wellbore, the second wellbore and the plurality of circuits form a substantially sealed closed loop; and wherein the plurality of circuits are balanced.

In an embodiment disclosed, the plurality of circuits comprises one or more of substantially equal circuit velocity; substantially equal circuit pressure drop; substantially equal circuit length; substantially equal circuit volume; substantially equal resistance, $\Delta P$/flow rate; and combinations thereof.

In an embodiment disclosed, a circuit parameter of the plurality of circuits substantially match.

In an embodiment disclosed, the circuit parameter comprises one or more of circuit fluid velocity; circuit pressure drop; circuit length; circuit volume; resistance, $\Delta P$/flow rate; and combinations thereof.

In an embodiment disclosed, the circuit parameter includes circuit fluid velocity and circuit length.

In an embodiment disclosed, the plurality of open hole circuits connect the first wellbore and the second wellbore in a first out/last in configuration, wherein flow across the plurality of open hole circuits is balanced.

In an embodiment disclosed, the system further comprises a heat exchange, adapted to extract thermal energy from a working fluid circulated through the plurality of open hole circuits.

In a further aspect, the present disclosure provides a method including providing a first wellbore extending from a surface to a subterranean geothermal formation, the first wellbore comprising a lateral section in the subterranean formation; providing a second wellbore extending from the surface to the subterranean geothermal formation, the second wellbore comprising a lateral section in the subterranean geothermal formation; providing a plurality of open hole circuits extending between the lateral section of the first wellbore and the lateral section of the second wellbore; wherein the first wellbore, the second wellbore and the plurality of circuits form a substantially sealed closed loop; and wherein the plurality of circuits are balanced, and circulating a working fluid through the substantially sealed closed loop in order to convey thermal energy from the subterranean geothermal formation to the surface.

In an embodiment disclosed, the plurality of circuits include one or more of substantially equal circuit fluid velocity; substantially equal circuit pressure drop; substantially equal circuit length; substantially equal circuit volume; substantially equal resistance, $\Delta P$/flow rate; and combinations thereof.

In an embodiment disclosed, the method further includes calculating a circuit parameter of a first circuit of the plurality of circuits, and adapting each of the remaining circuits of the plurality of circuits to substantially match the circuit parameter.

In an embodiment disclosed, the circuit parameter includes one or more of circuit fluid velocity; circuit pressure drop; circuit volume; circuit length; circuit resistance, $\Delta P$/flow rate; and combinations thereof.

In an embodiment disclosed, the method further includes calculating a circuit parameter of a first circuit of the plurality of circuits, and modifying each of the remaining circuits of the plurality of circuits to substantially match the circuit parameter.

In an embodiment disclosed, the circuit parameter includes one or more of circuit fluid velocity; circuit pressure drop; circuit length; circuit volume; circuit resistance, $\Delta P$/flow rate; and combinations thereof.

In an embodiment disclosed, wherein modifying each of the remaining circuits of the plurality of circuits comprises enlarging at least a portion of at least one of the plurality of circuits.

In an embodiment disclosed, the loop working fluid is at least partially circulated by a thermosiphon effect.

In an embodiment disclosed, the method further includes using at least a portion of the thermal energy to provide heating to a user.

In an embodiment disclosed, the method further includes generating electricity using at least a portion of the thermal energy.

In an embodiment disclosed, the circuit parameter includes circuit fluid velocity and circuit length.

In an embodiment disclosed, the method includes connecting the first wellbore and the second wellbore with the plurality of open hole circuits in a first out/last in configuration.

In an embodiment disclosed, flow across the plurality of open hole circuits is balanced.

In an embodiment disclosed, balanced includes one or more of substantially equal circuit fluid velocity, substantially equal circuit pressure drop, substantially equal circuit length, substantially equal circuit volume, and combinations thereof.

In an embodiment disclosed, a circuit parameter of the first circuit of the plurality of circuits is predetermined, and each of the remaining circuits of the plurality of circuits is adapted to substantially match the circuit parameter.

In an embodiment disclosed, the circuit parameter includes one or more of circuit fluid velocity, circuit pressure drop, circuit volume, circuit length, and combinations thereof.

In an embodiment disclosed, a circuit parameter of a first circuit of the plurality of circuits is calculated, and each of the remaining circuits of the plurality of circuits is modified to substantially match the circuit parameter.

In an embodiment disclosed, the circuit parameter includes one or more of circuit fluid velocity, circuit pressure drop, circuit volume, and combinations thereof.

In an embodiment disclosed, modified comprises enlarging at least a portion of at least one of the plurality of circuits.

In an embodiment disclosed, the method includes circulating a working fluid through the substantially sealed closed loop in order to convey thermal energy/heat from the subterranean geothermal formation to the surface.

In an embodiment disclosed, balanced comprises one or more of substantially equal circuit velocity, substantially equal circuit pressure drop, substantially equal circuit length, substantially equal circuit volume, and combinations thereof.

In an embodiment disclosed, a circuit parameter of the plurality of circuits substantially match each other. That is, the circuit parameter is substantially equal among the plurality of circuits.

In an embodiment disclosed, the circuit parameter comprises one or more of circuit fluid velocity, circuit pressure drop, circuit length, circuit volume, and combinations thereof.

In an embodiment disclosed, the circuit parameter comprises circuit fluid velocity and circuit length.

In an embodiment disclosed, the plurality of open hole circuits connect the first wellbore and the second wellbore in a first out/last in configuration, wherein flow across the plurality of open hole circuits is balanced.

In an embodiment disclosed, in addition to the circuits being substantially equal in length and volume, they connect the supply/return wells in a first out/last in configuration, thus creating a natural balanced flow across all circuits.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
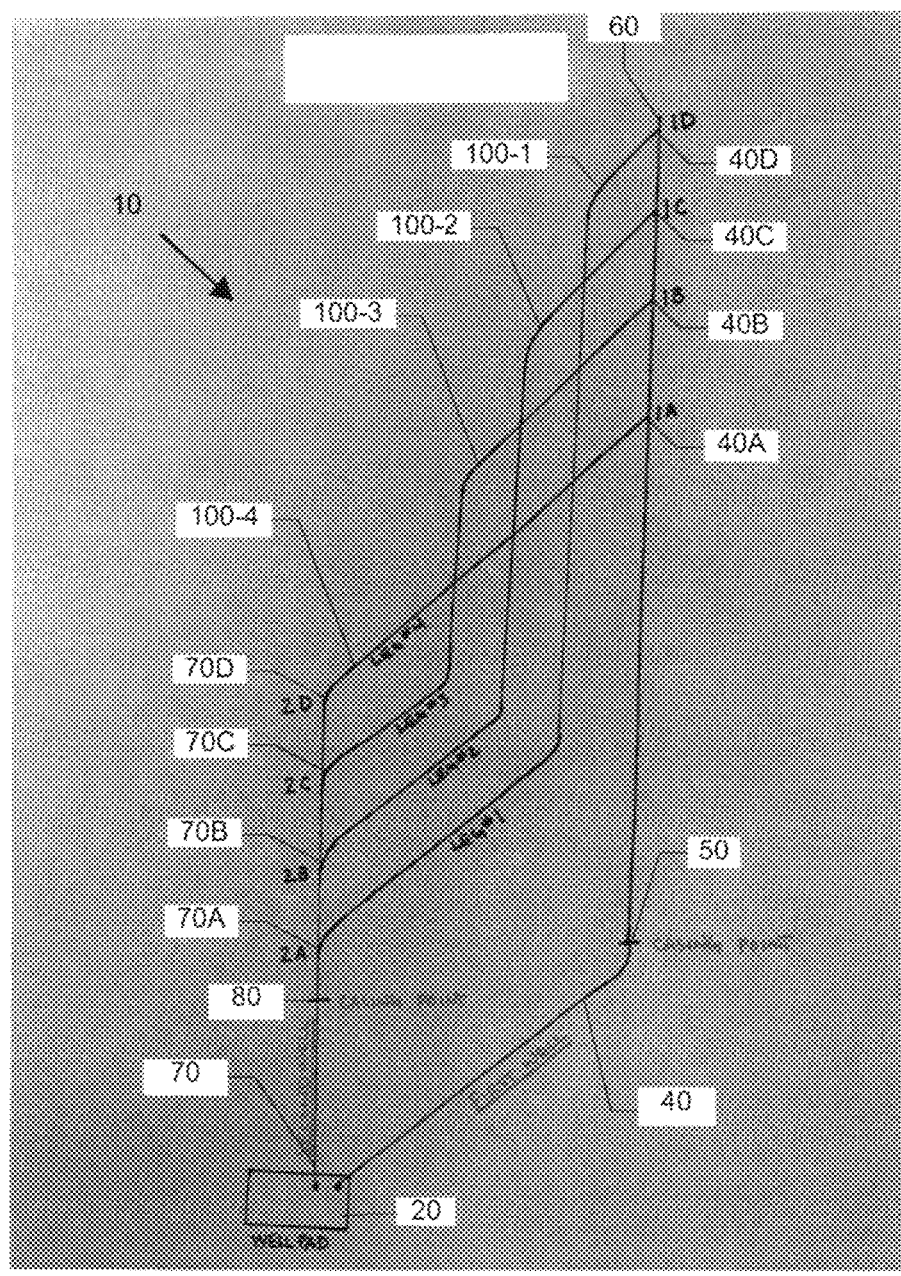
FIG. 1 is a simplified plan view of a closed-loop well system of the present disclosure.

Generally, the present disclosure provides a method and system for advanced geothermal well and/or closed-loop configuration.

A heat transfer solution may be conveyed through the loop at substantially equal flow rates across multiple circuits connecting two vertical wellbores with equal resistance as a loop working fluid. The heat transfer fluid may be one of any suitable fluid, and may, for example include water, water/glycol, or supercritical $CO_2$.

Surface boost pumps may be required to initiate flow. Once the flow has started, a balanced loop design and temperature differentials may initiate or maintain a thermosiphon effect. The thermosiphon effect may contribute to reducing pumping penalties.

As colder heat transfer fluid from the surface displaces the hotter heat transfer fluid located within the loop, the heat transfer solution absorbs heat from the surrounding rock and may be forced through the loop circuit back to surface where it can be utilized in several applications.

Temperatures may be monitored and maximum heat transfer can be achieved by simply controlling the fluid velocity. The heat transfer solution can be selected or modified so that no phase change occurs, or to induce a phase change.

In exemplary embodiments, temperatures within the target zones may vary throughout the world, ranging from 50° C. to 200+° C. The hot heat transfer solution may be utilized in a variety of applications, for example direct or indirect heating and/or cooling, and/or generating electricity and/or other uses of heating and/or combinations thereof. Energy may be used or converted using process cycles, for example electricity may be generated using process cycles such as, for example flash steam, double flash, Organic Rankine Cycle (ORC), or other processes depending on the enthalpy of the loop solution.

In some embodiments, the available heat in the hot loop solution may be of relatively low temperature, for example 50° C. to 70° C. In such cases low grade heat applications such as district heating, site specific applications such as aquaponics, greenhouse heating or process heating/cooling are ideal end uses for a stable heat source. If electricity is required with low enthalpy heat, process cycles such as cogeneration heat extraction or Carnot engines may be used to generate electricity for delivery to a proximate user and/or for grid delivery with or without storage before delivery.

With the heat energy extracted from the loop solution, the cold fluid may be circulated back downhole to repeat the cycle. Energy to power the boost pumps and/or process cycles and/or auxiliary equipment may be provided by the system itself, providing a zero carbon emission system, and/or a net-negative carbon emission system taking into account materials and construction of the system.

Several procedures may be used to complete a similar or same well design. In an embodiment disclosed, the wells described below as a first well and a second well may be drilled from the same well pad.

Example 1

Referring to FIG. 1, in a system 10 of the present disclosure, from a well pad 20, a first well 40 may be drilled down to a formation true vertical depth (TVD) and landed at ~90 degrees with directional drilling tools. The first well 40 may be cased to this point, identified as an intermediate casing point (ICP), first well ICP 50, and then drilling may continue out, open hole and holding ~90 degrees for the length of the first well 40 to a toe 60 of the first well 40.

From the well pad 20, a second well 70 may be drilled to ~90 degrees at to a similar TVD, with a well separation between the first well 40 and the second well 70, for example about ~1000 m. The second well 70 may then be cased to the ICP, second well ICP 80. When drilling out the second well 70, a well path may be followed that allows for an open hole sidetrack point before being steered toward the toe 60 of the first well 40.

In an embodiment disclosed, a plurality of circuits 100 may extend between the first well 40 and the second well 70 through formation 110 in order to increase the transfer of heat from the formation 110 to a heat transfer fluid circulated through the first well 40, second well 70 and one or more of the plurality of circuits 100, for example. In a given system the number of circuits 100 may be n, where 2≤n≤y. For simplification of illustration, n=4, i.e. four (4) circuits 100 or "legs" are shown as an example only as 100-1, 100-2, 100-3, 100-4. The maximum number of circuits 100 may be much higher than 4, for example y may be unlimited. However, practically/physically speaking, the number of circuits 100 extending between the first well 40 and the second well 70 may be selected or predetermined for example to be between 2 and 200, between 2 and 100, between 2 and 75, between 2 and 50, between 2 and 40, between 2 and 30, between 2 and 25, between 2 and 20, and/or between 2 and 10.

At the toe 60 of the first well (see region 40D in FIG. 1), a guide, such as magnetic ranging technology may be used to guide circuit 100-1 of the second well 70 into the first well 40 and complete a connection (region 70A to region 40D in FIG. 1). The drill may then be pulled back to the sidetrack point (region 70B in FIG. 1) and an open hole sidetrack performed to create a circuit 100-2. Circuit 100-2 of the second well 70 may be drilled ahead (region 70A to region 70B in FIG. 1) and then toward the first well 40 (region 70B to region 40C in FIG. 1), with a sidetrack point created, and connected with magnetic ranging technology (region 70B to region 40C in FIG. 1).

After drilling the second circuit 100-2, a calculation and/or measurement and/or other determination may be made to determine the volume in the second circuit 100-2 compared to the first circuit 100-1, and a string hole opener may be used to open up parts of the second circuit 100-2 to match, within a selected variance, such as for example about 10 percent or less the volume of the first circuit 100-1.

The drill may then be pulled back to the sidetrack point of the second circuit 100-2 and the process may be repeated for a third circuit 100-3 (region 70C to region 40B in FIG. 1) and a fourth circuit 100-4 (region 70D to region 40A in FIG. 1), including the volume matching. In an embodiment disclosed, the length of the circuits 100 may be as close as possible to each other.

Therefore, if diameter and length of the circuits 100 are symmetrical, a substantially equal resistance to flow may be achieved across the circuits. It is also relevant to have spacing between circuits on exit points similar to the distance between circuits at entry points.

Example 2

Figure 2:
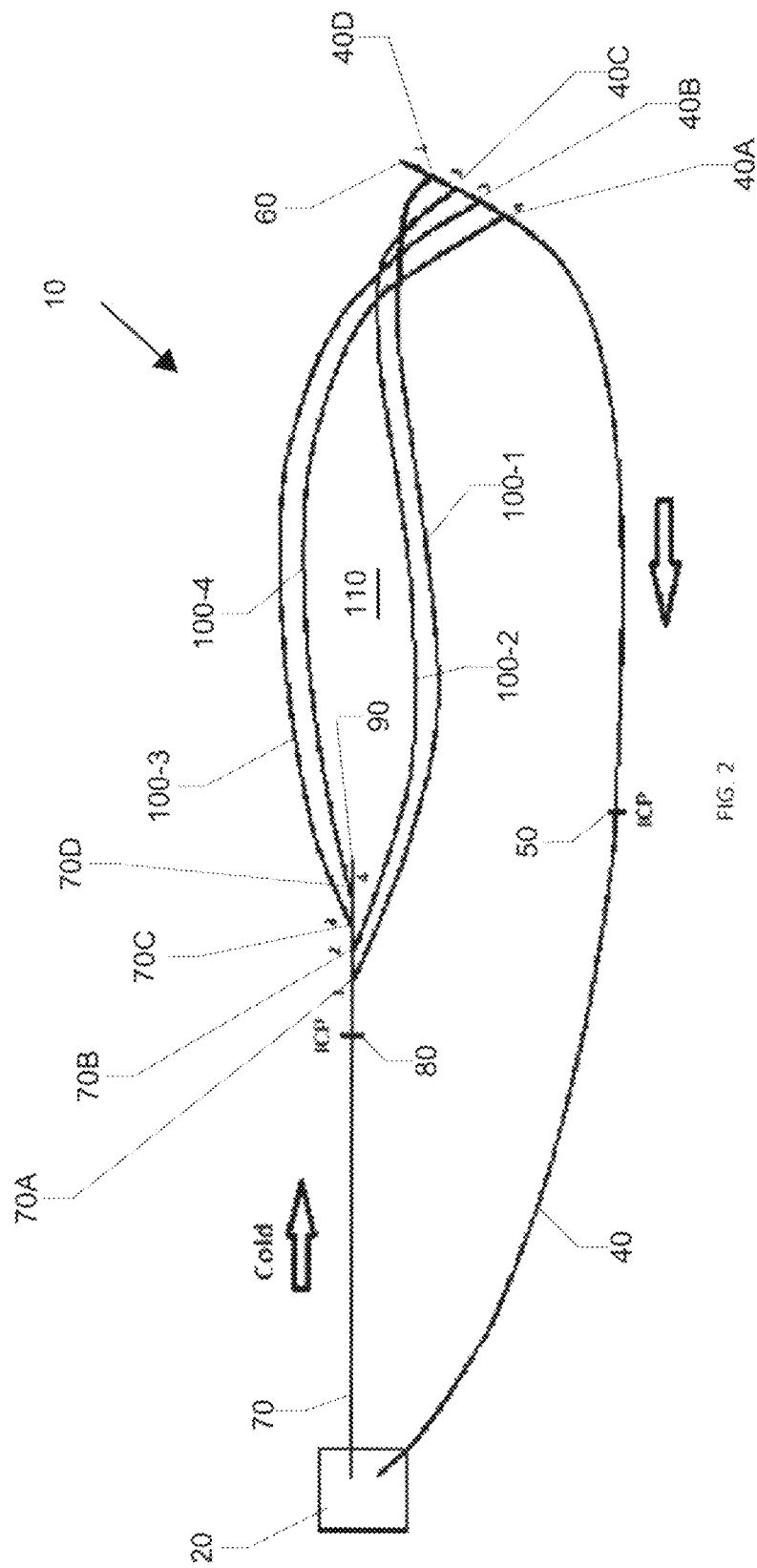
FIG. 2 is a plan view a closed-loop well system of the present disclosure (Embodiment i).
Figure 3:
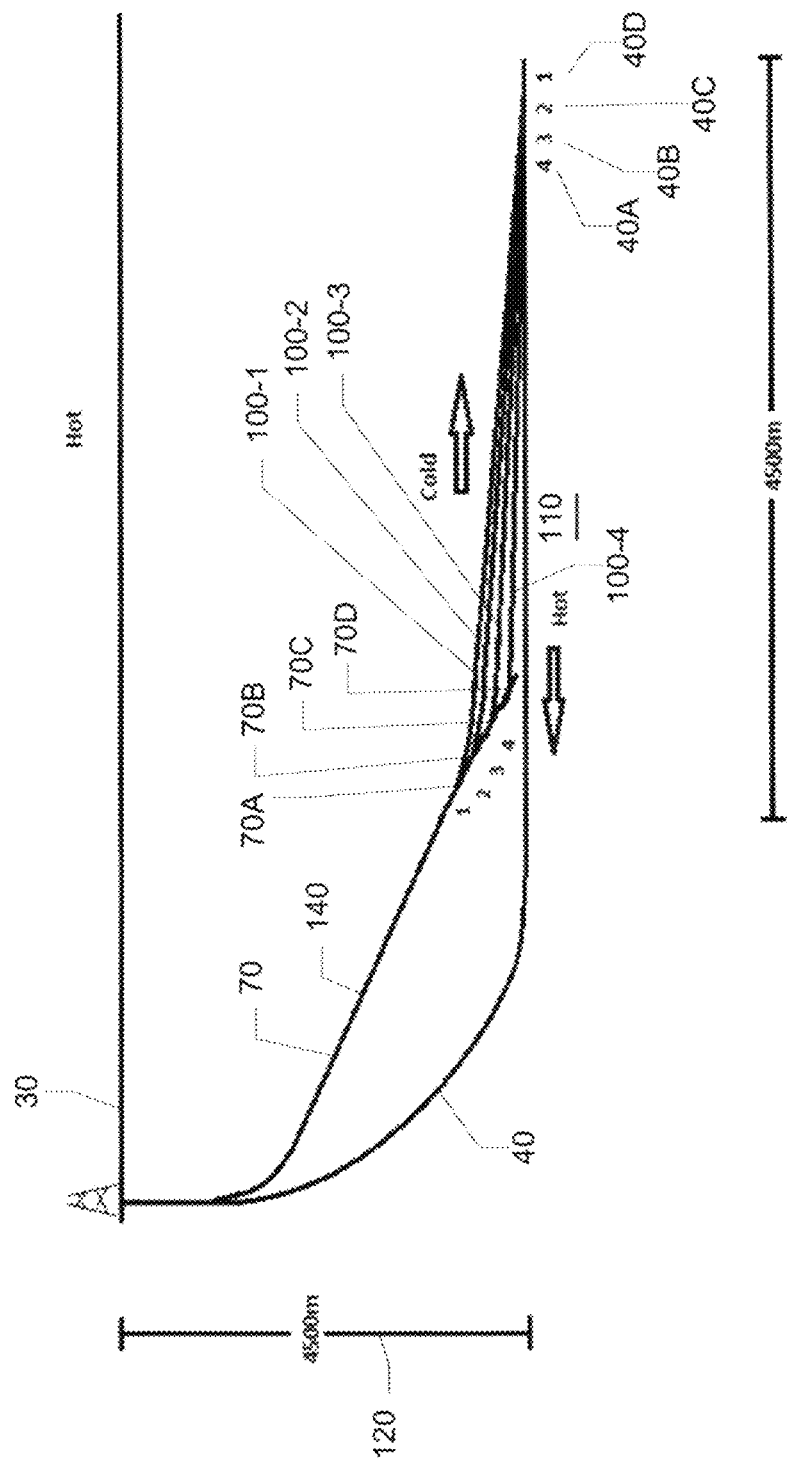
FIG. 3 is a side cross-section of the closed-loop well system of FIG. 2.
Figure 4:
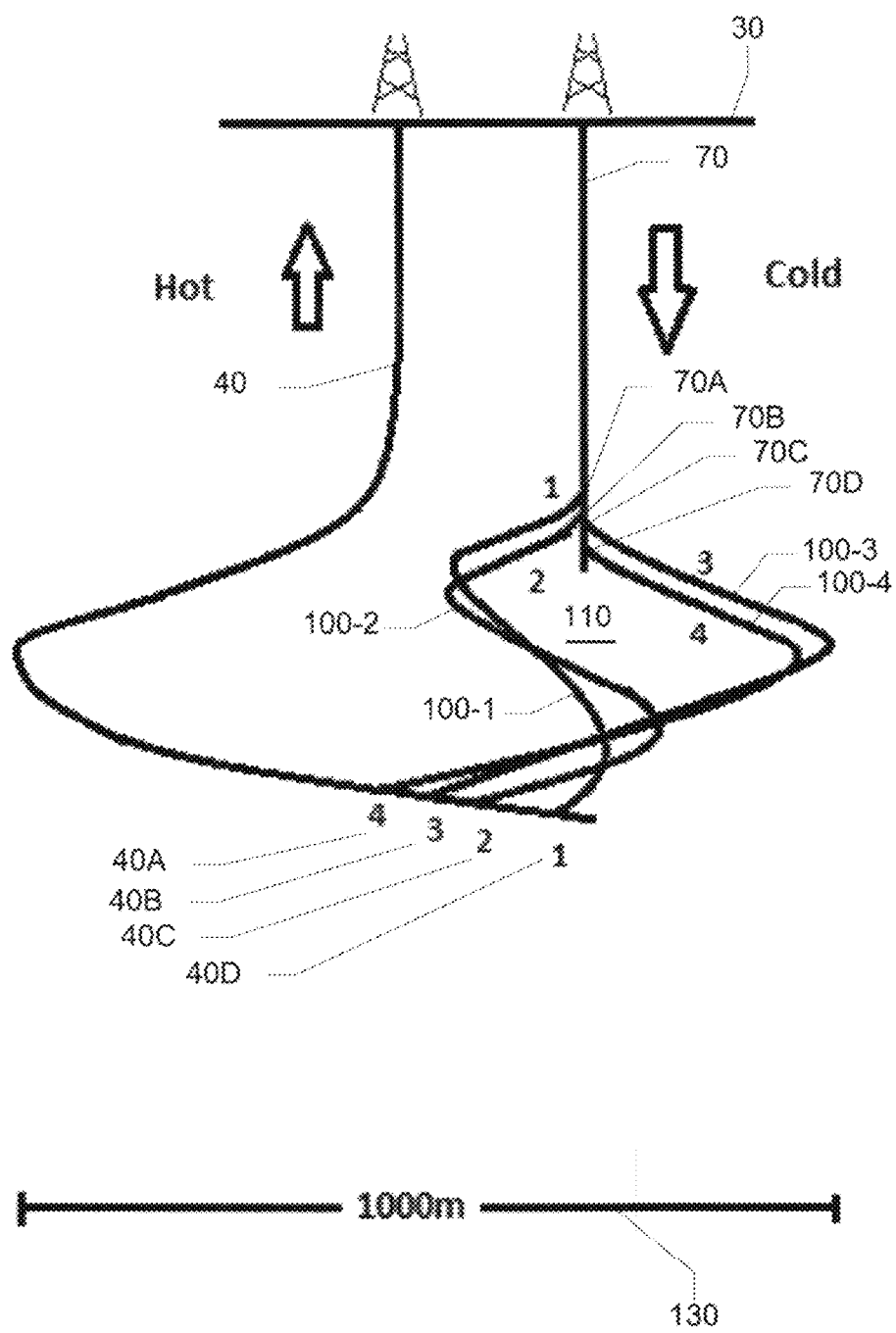
FIG. 4 is a head-on cross section of the closed-loop well system of FIG. 2.

Referring to FIGS. 2-4 (Embodiment i), a first well 40 may be drilled down to the formation TVD 120 and landed at ~90 degrees with directional drilling tools. The illustrated 4500 m TVD is an example only. The first well 40 may be cased to this point, first well ICP 50, and then drilling continues out and holding ~90 degrees for the length of the first well 40.

A second well 70—may then be drilled to ~80 degrees at a slightly higher TVD, for example ~100-200 m, with a well separation 130 between the first well 40 and the second well 70, for example about ~1000 m. The second well 70 may then be cased to the second well ICP 80.

After drilling out the second well 70 an inclination 140 may be maintained to total depth (TD), for example about ~80-90 degrees inclination.

An open hole, retrievable whipstock may then be set in the second well 70 at a fourth circuit sidetrack point region 70D and a fourth circuit 100-4 (i.e. in the example shown with n=4) may be drilled from the second well 70 towards the first well 40 and a guide, such as magnetic ranging tools may be used to guide the fourth circuit 100-4 to connect with the first well 40 at region 40A.

The open hole, retrievable whipstock may be retrieved and moved to a third sidetrack point region 70C and the procedure repeated towards the first well 40 at region 40B, and may then be repeated for a second circuit 100-2 between the second well 70 region 70B and the first well 40 region 40C and then a first circuit 100-1 between the second well 70 region 70A and the first well 40 region 40D. Generalized, the process may be repeated for each circuit n, n−1, n−2, n−3 and so on until reaching a first circuit.

After drilling each circuit 100, a calculation and/or measurement and/or other determination may be made to determine the volume within the circuit 100, and a string hole opener may be used to open up at least a portion of each circuit to match, within a selected variance, such as for example about 10 percent or less the volume of the fourth circuit 100-4 (i.e. the first circuit completed).

When completed and in operation, a working fluid may be circulated through the circuits 100 to convey heat from the subterranean formation 110 to the surface 30. As illustrated, for example, relatively cold or cooled working fluid may be circulated down the second well 70, through circuits 100 becoming relatively hot or heated, and up the first well 40. However, such loop circulation direction may be reversed.

Any dimensions shown are mere examples, and illustrative of but one embodiment disclosed, e.g. 4500 m TVD and 4500 m length of FIGS. 3 and 1000 m of FIG. 4.

Example 3

Figure 5:
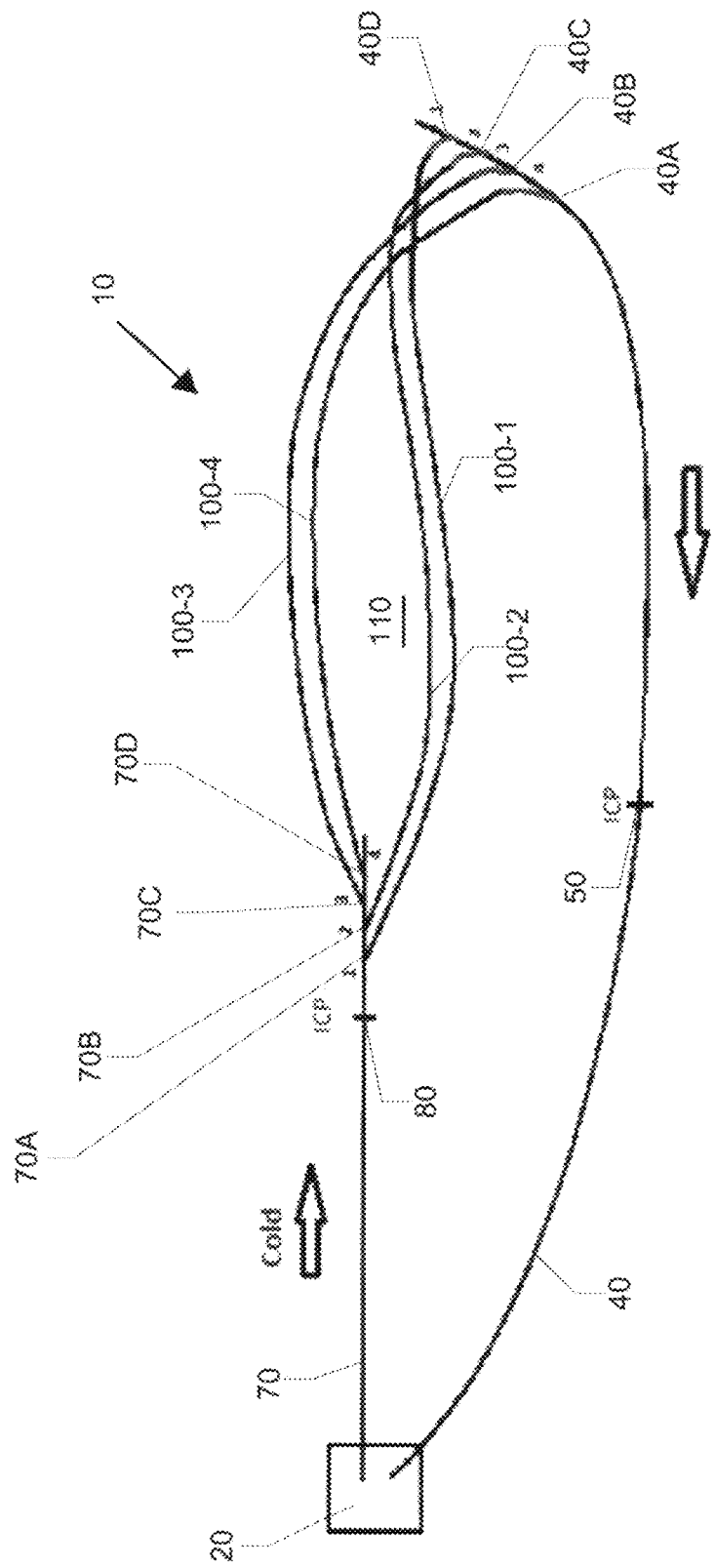
FIG. 5 is a plan view of a closed-loop well system of the present disclosure (Embodiment ii).
Figure 6:
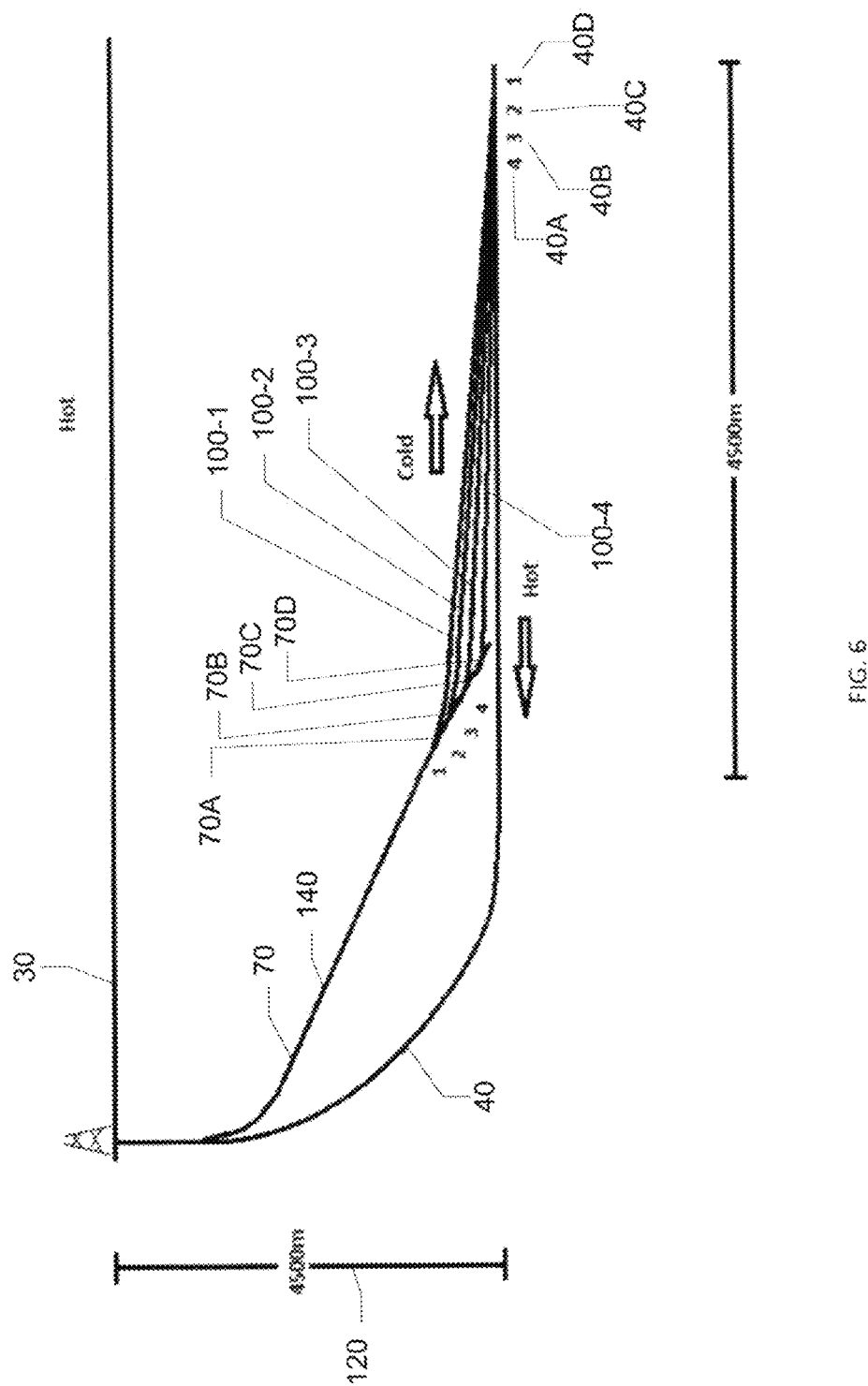
FIG. 6 is a side cross-section of the closed-loop well system of FIG. 5.
Figure 7:
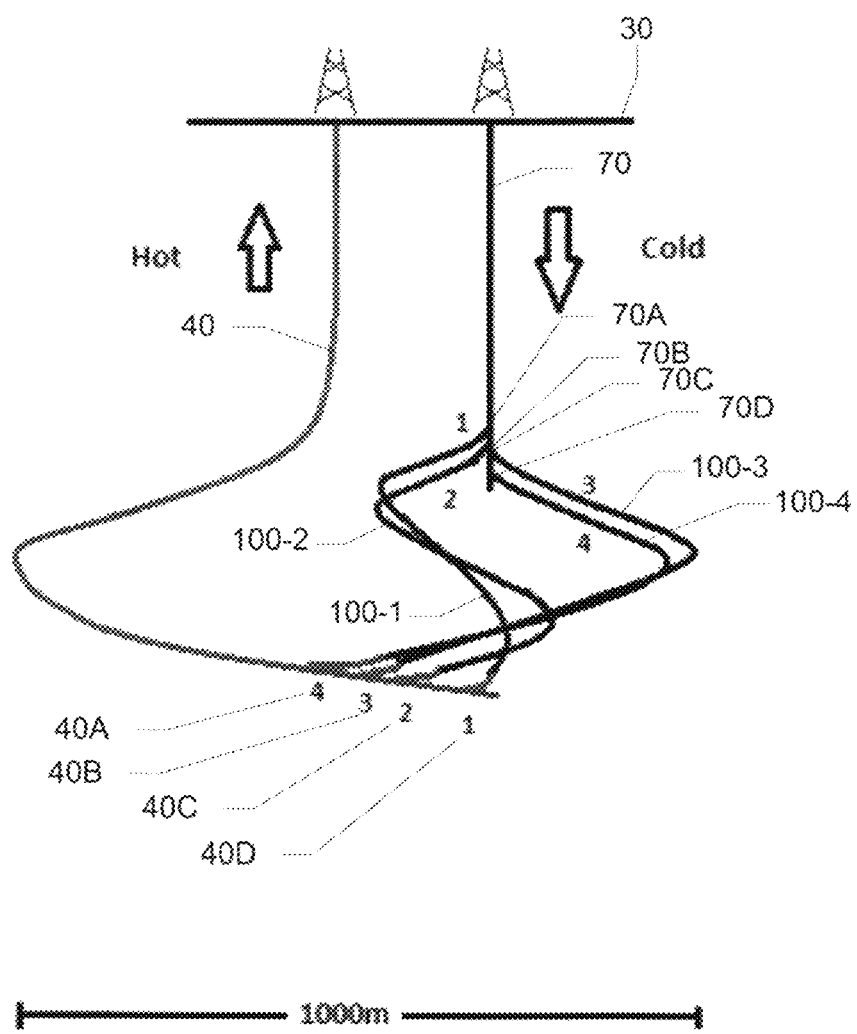
FIG. 7 is a side cross-section of the closed-loop well system of FIG. 5.

Referring to FIGS. 5-7 (Embodiment ii), a first well 40 may be drilled down to the formation TVD and landed at ~80-90 degrees with directional drilling tools. After casing the first well 40 to this point, the first well ICP 50, then drilling may continue out and holding ~90 degrees for the length of the first well 40. After TD, a retrievable, open hole whipstock may be set at a fourth circuit connection point, region 40D and a sidetrack, for example about ~100 m drilled to make a later magnetic ranging connection easier. The whipstock may then be retrieved and moved to a third circuit connection point, region 40C and the procedure repeated, and then continued for a second circuit connection point, region 40B and then a first circuit connection point, region 40A.

A second well 70 may then be drilled to ~80-90 degrees at a slightly higher TVD, with a well separation 130 between the first well 40 and the second well 70, for example about ~1000 m. The second well 70 may then be cased to the second well ICP 80. After drilling out the second well 70, an ~80-90 degree inclination 140 may be maintained to TD. An open hole, retrievable whipstock may then be set at the fourth circuit sidetrack point, region 70D, and the fourth circuit 100-4 may be drilled towards the first well 40 and connected with magnetic ranging tools, region 40A. The open hole, retrievable whipstock may be retrieved and moved to the third circuit sidetrack point, region 70C and the third circuit 100-3 drilled towards the first well 40 and connected with magnetic ranging tools, region 40B, and the procedure may continue for a second circuit 100-2 extending between region 70B and region 40C and then a first circuit 100-1 extending between region 70A and 40D. After drilling each circuit, a calculation and/or measurement and/or other determination may be made to determine the volume within the circuit 100, a string hole opener may be used to open up parts of each circuit to match within a selected variance, such as for example about 10 percent or less the volume of the fourth circuit 100-4 (i.e. the first circuit completed).

When completed and in operation, a working fluid may be circulated through the circuits 100 to convey heat from the subterranean formation 110 to the surface 30. As illustrated, for example, relatively cold or cooled working fluid may be circulated down the second well 70, through circuits 100 becoming relatively hot or heated, and up the first well 40. However, such loop direction may be reversed.

Any dimensions shown are mere examples, and illustrative of but one embodiment disclosed, e.g. 4500 m TVD and 4500 m length of FIGS. 6 and 1000 m of FIG. 7.

Example 4

Figure 8:
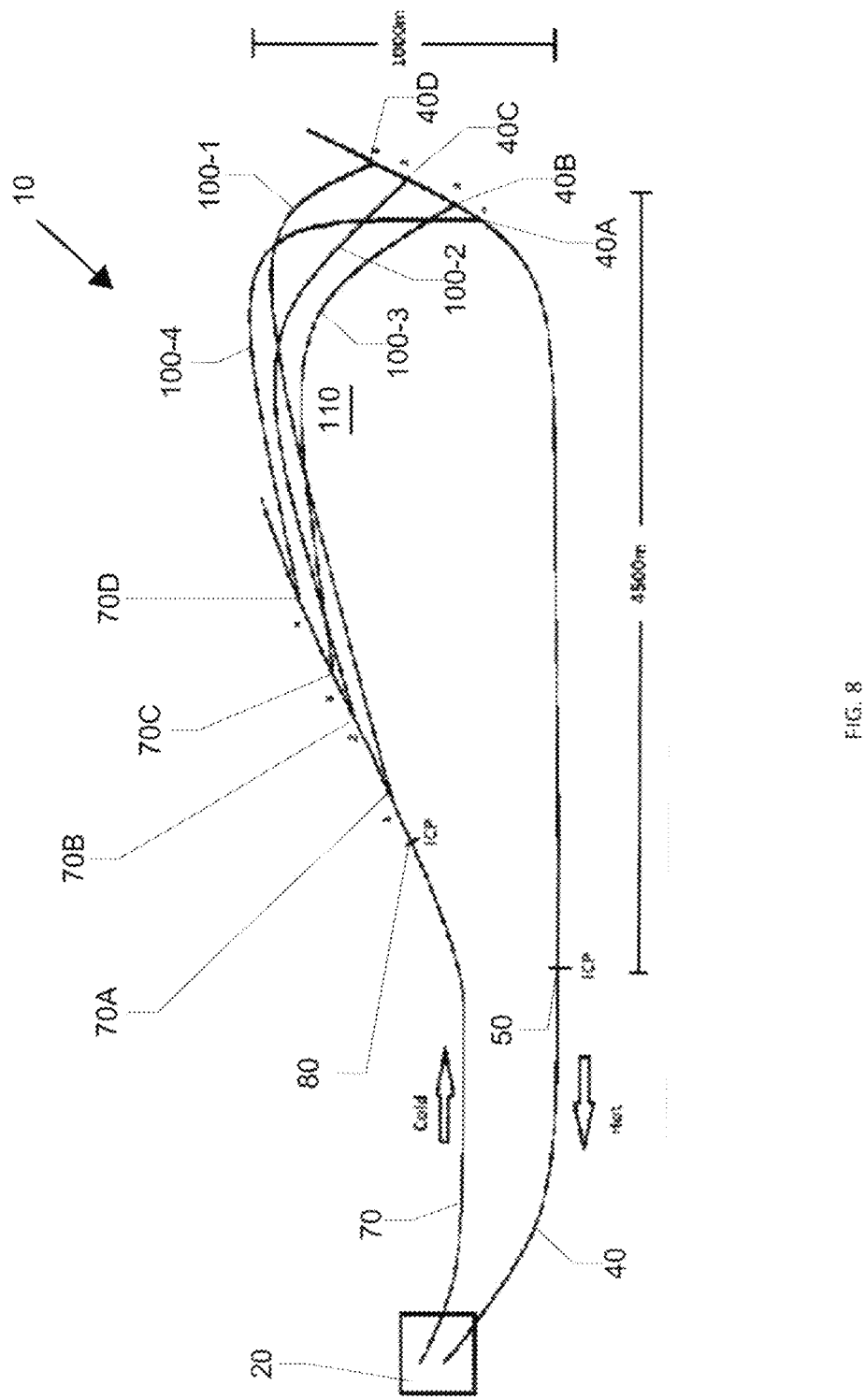
FIG. 8 is a plan view of a closed-loop well system of the present disclosure (Embodiment iii).
Figure 9:
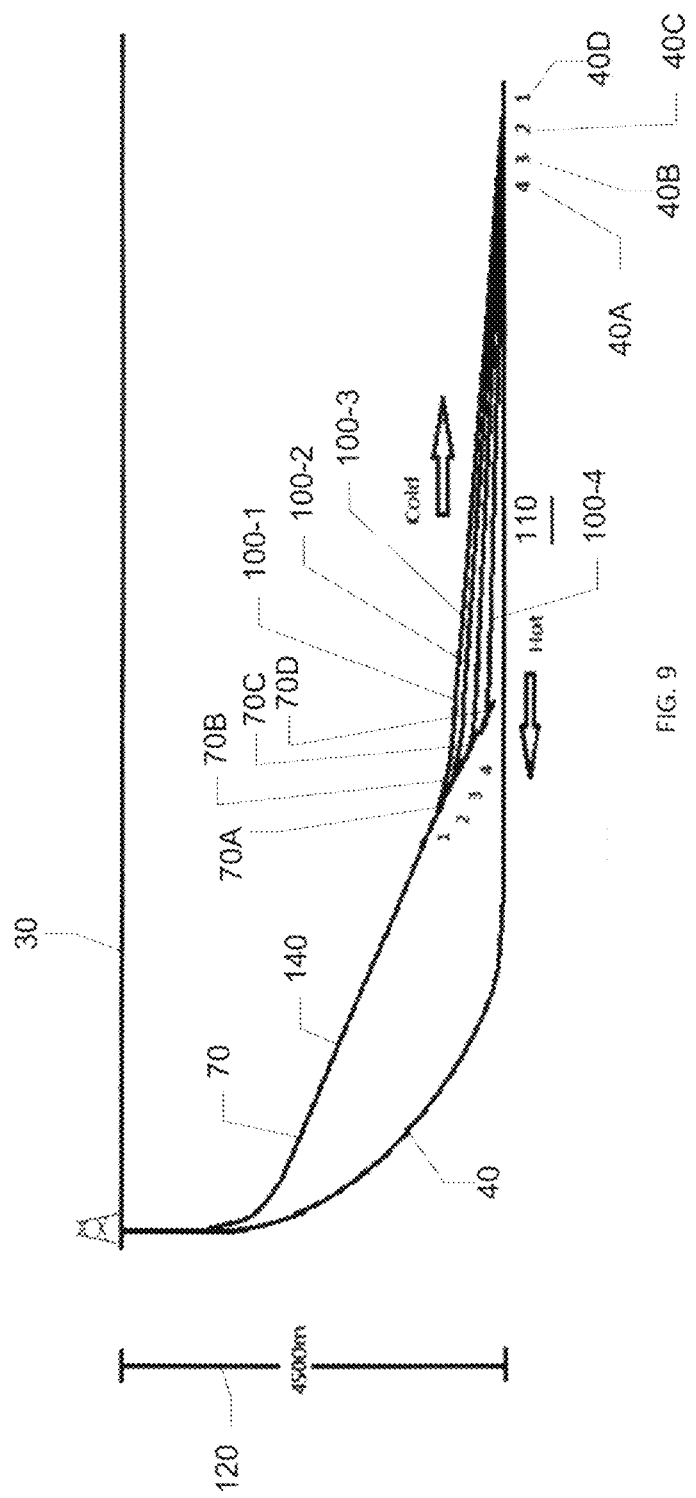
FIG. 9 is a side cross-section of the closed-loop well system of FIG. 8.
Figure 10:
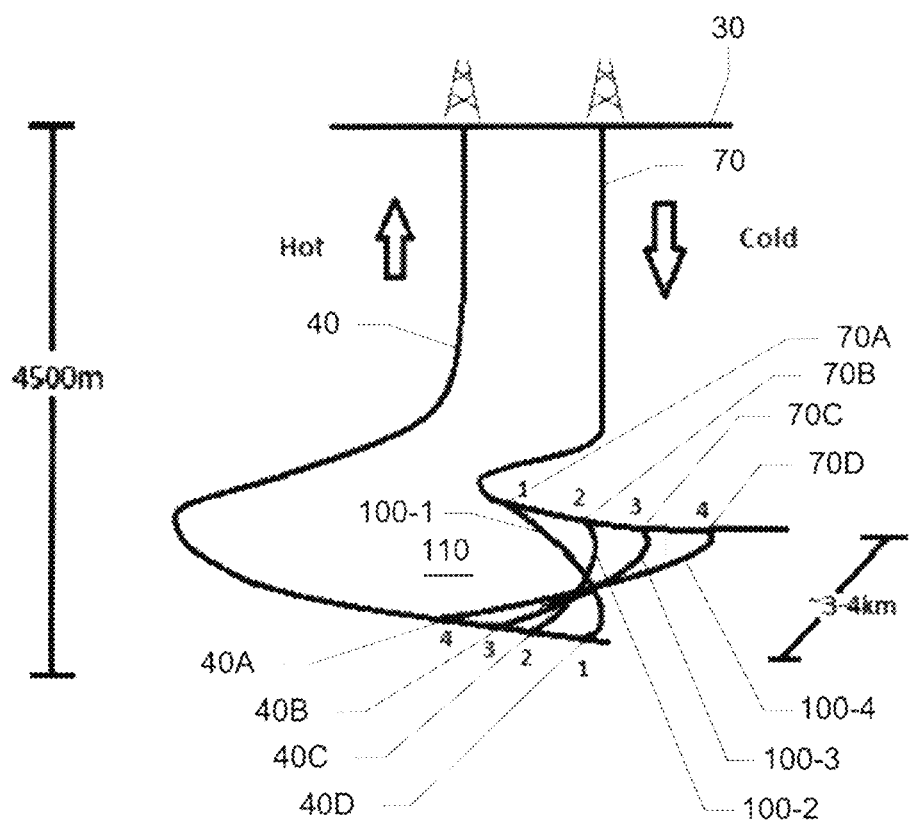
FIG. 10 is a side cross-section of the closed-loop well system of FIG. 8.

Referring to FIGS. 8-10 (Embodiment iii), a first well 40 may be drilled down to the formation TVD and landed at ~80-90 degrees with directional drilling tools. After casing the first well 40 to this point, the first well ICP, then drilling may continue out and hold ~80-90 degrees for the length of the first well 40.

A second well 70 may then be drilled to ~80-90 degrees at a slightly higher TVD, with a well separation between the first well 40 and the second well 70, for example about ~1000 m. The second well 70 may then be cased to the second well ICP 80.

After drilling out the second well 70 an inclination 140 may be maintained to TD, for example about ~80-90 degree inclination.

An open hole, retrievable whipstock may then be set at a fourth circuit sidetrack point, region 70D and a fourth circuit 100-4 drilled from the second well 70 towards the first well 40 and connected with magnetic ranging tools, region 40A. The open hole, retrievable whipstock may be retrieved and moved to a third circuit sidetrack point, region 70C and a third circuit 100-3 drilled from the second well 70 towards the first well 40, region 40B, and the procedure may continue for the second circuit 100-2 between region 70B and region 40C, and the first circuit 100-1 between region 70A and region 40D. After drilling each circuit, a calculation and/or measurement and/or other determination may be made to determine the volume within the circuit, and a string hole opener may be used to open up parts of each circuit to match within a selected variance, such as, for example, about ≤10% the volume of the fourth circuit 100-4 (i.e. the first circuit completed).

When completed and in operation, a working fluid may be circulated through the circuits 100 to convey heat from the subterranean formation 110 to the surface 30. As illustrated, for example, relatively cold or cooled working fluid may be circulated down the second well 70, through circuits 100 becoming relatively hot or heated, and up the first well 40. However, such loop circulation direction may be reversed.

Any dimensions shown are mere examples, and illustrative of but one embodiment disclosed, e.g. 1000 m and 4500 m length of FIG. 8, 4500 m TVD of FIGS. 9 and 4500 m TVD and 3-4 km length of FIG. 10.

Variations

The system and method of the present disclosure may be practiced using a wide variety of well configurations and drilling/completions techniques. Examples 5-8 below refer to Embodiments 1 and 2 and options A and B. Example 9 refers to Embodiment 3.

In terms of the general design and shape of the wells, 1A, 1B, 2A and 2B may be substantially similar. A difference between A and B for both Embodiments 1 and 2, may be, for example, the way in which the wells are drilled and connected, each of which is an example contemplated within the scope of the present disclosure. However, the first wellbore, the second wellbore, a plurality of open hole circuits extending between the first wellbore and the second wellbore, forming a substantially sealed closed loop may be drilled and completed in accordance with known well drilling techniques.

Embodiments 1 and 2 are substantially similar, and a difference may be the shape/direction in which the down leg is drilled. Embodiment 1 may have a "straight" (plan view) shape to it, with 2 legs branching off on the left and 2 on the right. Embodiment 2 may have a "curved" (plan view) down leg main arm and then the branched legs come off on the right-hand side.

In option B, the up well is drilled to TD (total depth) and then the drill string pulled back, side tracked and each branched arm (sections marked "A") in order (A, B, C, D). A directional guided tracker may be deployed, for example by a coil tubing rig. Because the tracker is directionally guided, one would be able to re-enter each individual arm with the directional ranging tool, and one could then aim for the ranging tool in each of the branches when drilling the down legs and connecting them.

Embodiment 3 may be implemented, for example, when a surface location may be placed generally central to a target reservoir of interest. The closed loop system of Embodiment 3 may use a curved hook intermediate section while drilling down and gaining inclination towards a horizontal direction or about 90 degrees.

Example 5

Figure 11:
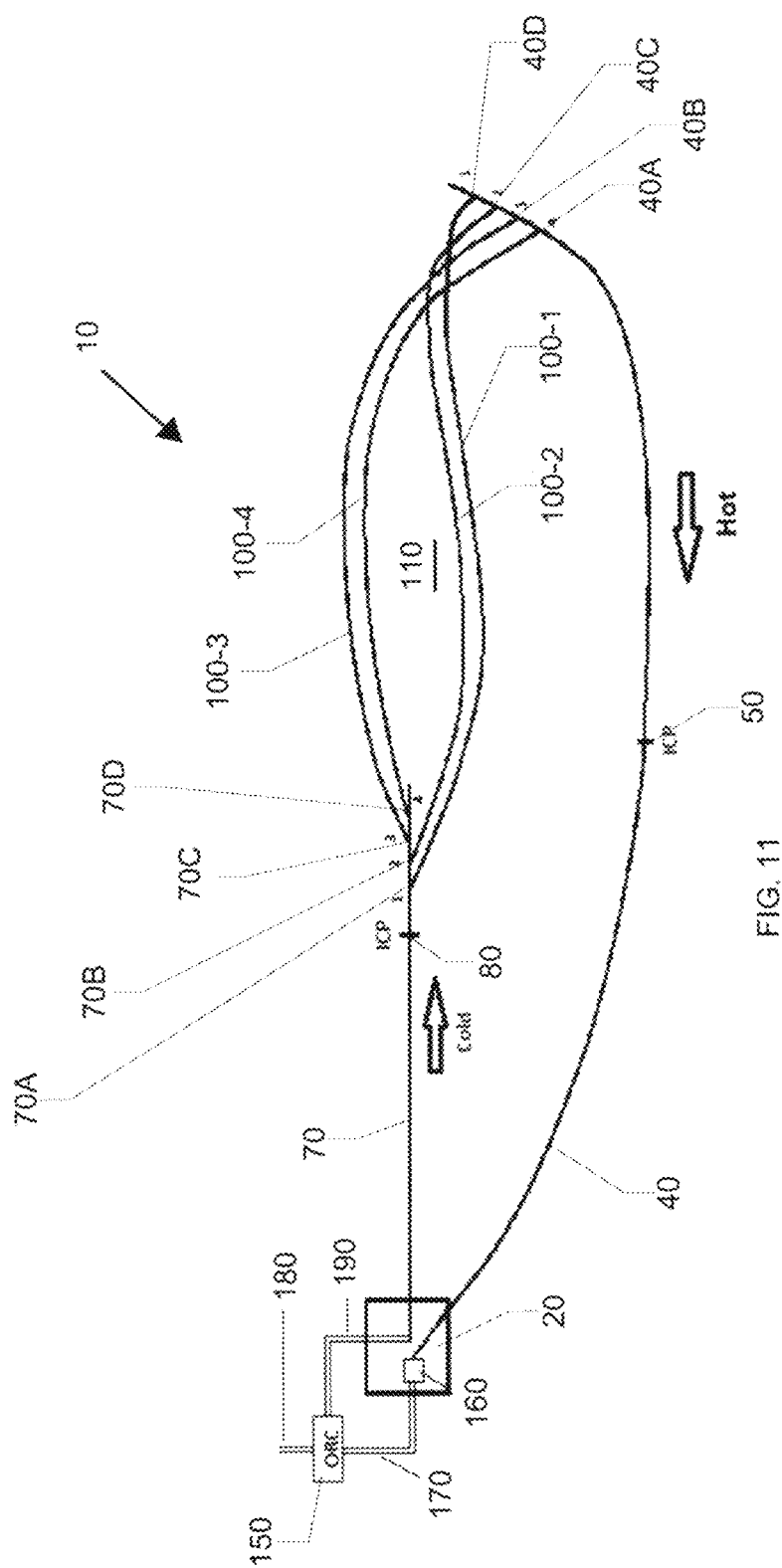
FIG. 11 is a plan view of a closed-loop well system of the present disclosure (Embodiment 1A).
Figure 12:
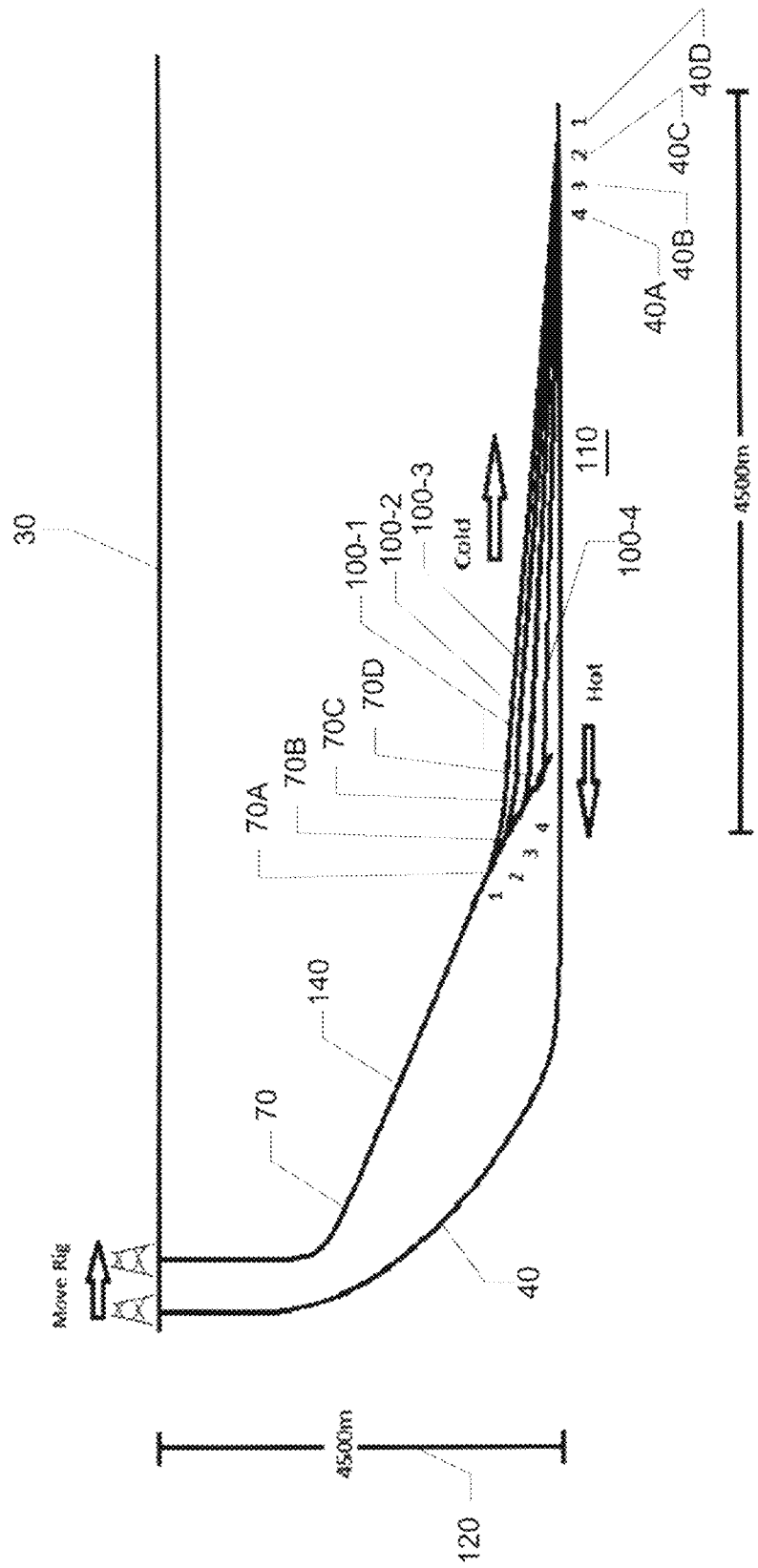
FIG. 12 is a side cross-section view of the closed-loop well system of FIG. 11.
Figure 13:
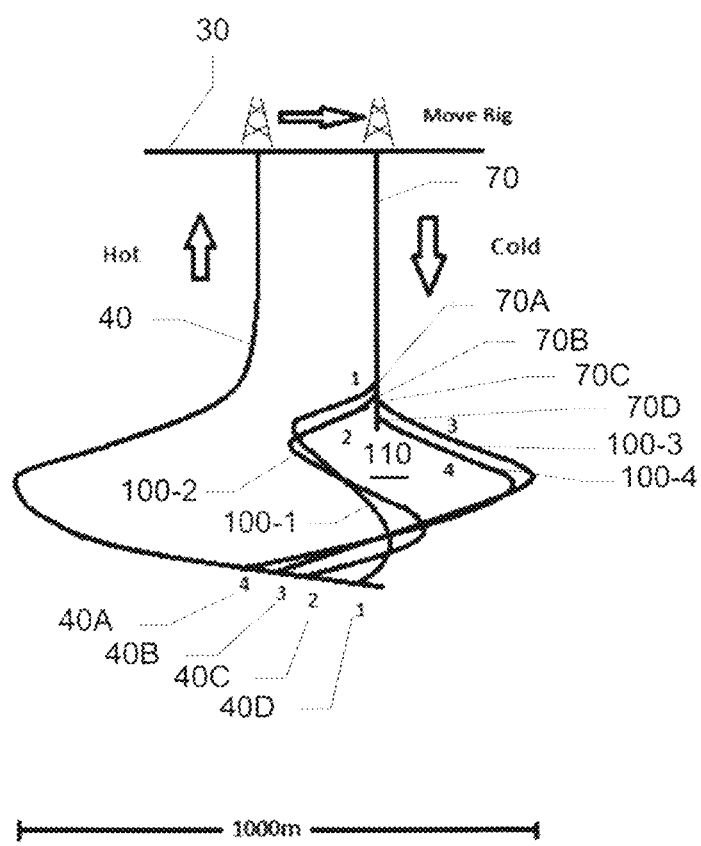
FIG. 13 is a head on cross-section view of the closed-loop well system of FIG. 11.

Referring to FIGS. 11-13 (Embodiment 1A), a general schematic illustrates some options for using the heat extracted from the subterranean geothermal formation. The recovered thermal energy may be used for a variety of purposes. For example dependent on one or more of the temperature and/or quantity and/or user need(s) and/or economics and/or other factor(s). Thermal energy of the loop working fluid may, for example, be used for thermal energy processes and/or may be used for heating, such as heating a greenhouse.

In an embodiment disclosed, the working fluid, heated in the loop, may be used directly as thermal energy for district heating, e.g. the heated working fluid conveyed by pipeline 180 to/from the user, such as a town or greenhouse, and then returned to the loop by pipeline 190. In an embodiment disclosed, the working fluid, heated in the loop, and a district heating fluid are isolated from one another, and the district heating fluid is heated by the working fluid via heat exchanger 160 and the district heating fluid conveyed by pipeline 180 to/from the user, such as a town or greenhouse, and then returned to the heat exchanger 160 for reheating by the working fluid. In an embodiment disclosed, use of the thermal energy may include a thermal process, such as an Organic Rankine Cycle (ORC) system 150. In such embodiment, if an ORC system 150 or other thermodynamic system is present, the loop working fluid would remain isolated from and not touch/mix with the ORC system fluid. The working fluid, after passing through the heat exchanger 160 could be used for example as above. In an embodiment disclosed a further heat exchanger may be used to heat a district heating fluid for district heating for example as above and/or combinations thereof. If no ORC system 150 is installed, e.g. no electricity production, just thermal energy/heat use, the loop working fluid could be used directly in the district heating pipe line 180. These are only a few examples, shown in association with the closed-loop well system of the present disclosure, for example as shown in FIGS. 1-10.

In an embodiment disclosed, the thermal energy of the working fluid, proximity of user, and other factors may influence the design. In an embodiment disclosed, for example, thermal energy of 120° C. may be more suitable for thermal energy processes.

In addition, FIG. 11 illustrates heat in hot heat transfer loop solution may be provided to an Organic Rankine Cycle (ORC) system 150 via a heat exchanger 160 and pipeline 170 to the ORC system 150. The thermal energy may be used for district heating, such as by delivering heated fluid by a pipeline 180 to a nearby user, such as a town for district heating or for example greenhouse, hydroponics, aquaculture or combinations thereof. Fluid from the ORC system 150 may be returned to the heat exchanger 160 for reheating and the process repeated. The ORC system may use heated fluid to expand a gas with a low boiling point to spin a turbine and create electricity, excess thermal energy that is not used up by the ORC can then be sent via heated water through pipeline 180 into town for district heating as described above.

In the Figs., an ORC system 150 is illustrated in simplified form. Hot loop working fluid passes through the closed loop system to the heat exchanger 160 to heat up an isolated fluid (isolated from the loop working fluid), this isolated heated fluid is then piped to the ORC system 150 via pipeline 170, where the thermal energy in the isolated fluid is used. The heat may be used for district heating as described, without creating electricity, or it may be used, for example to expand a gas to drive a turbine to create electricity in the ORC system 150 or other thermodynamic process. As an example, the isolated fluid may comprise water. There may remain some thermal energy in the water isolated fluid, e.g. water after it has been used by the ORC, and this fluid, e.g. water can be sent to a nearby heating user, such as a town for district heating and/or industrial or commercial user for process or other heating by pipeline 180. The remaining isolated water not used by the ORC system 150 or heating may be sent downhole for reheating via return down flow line 190 if the loop working fluid was used or returned to the heat exchanger 160 for reheating if the isolated fluid was used.

In an embodiment disclosed, the loop working fluid may be used directly to drive a thermodynamic process, for example ORC system 150, or the loop working fluid may be provided to pipeline 180 for district heating as described above. In an embodiment disclosed, the loop working fluid may be used indirectly to heat an intermediate, isolated fluid, and the isolated fluid used to drive a thermodynamic process, for example ORC system 150, or the isolated fluid may be provided to pipeline 180 for district heating as described above. The thermal energy of the loop working fluid may be used directly and/or indirectly.

Any dimensions shown are mere examples, and illustrative of but one embodiment disclosed, e.g. 4500 m TVD and 4500 m length of FIGS. 12, and 1000 m of FIG. 13.

Example 6

Figure 14:
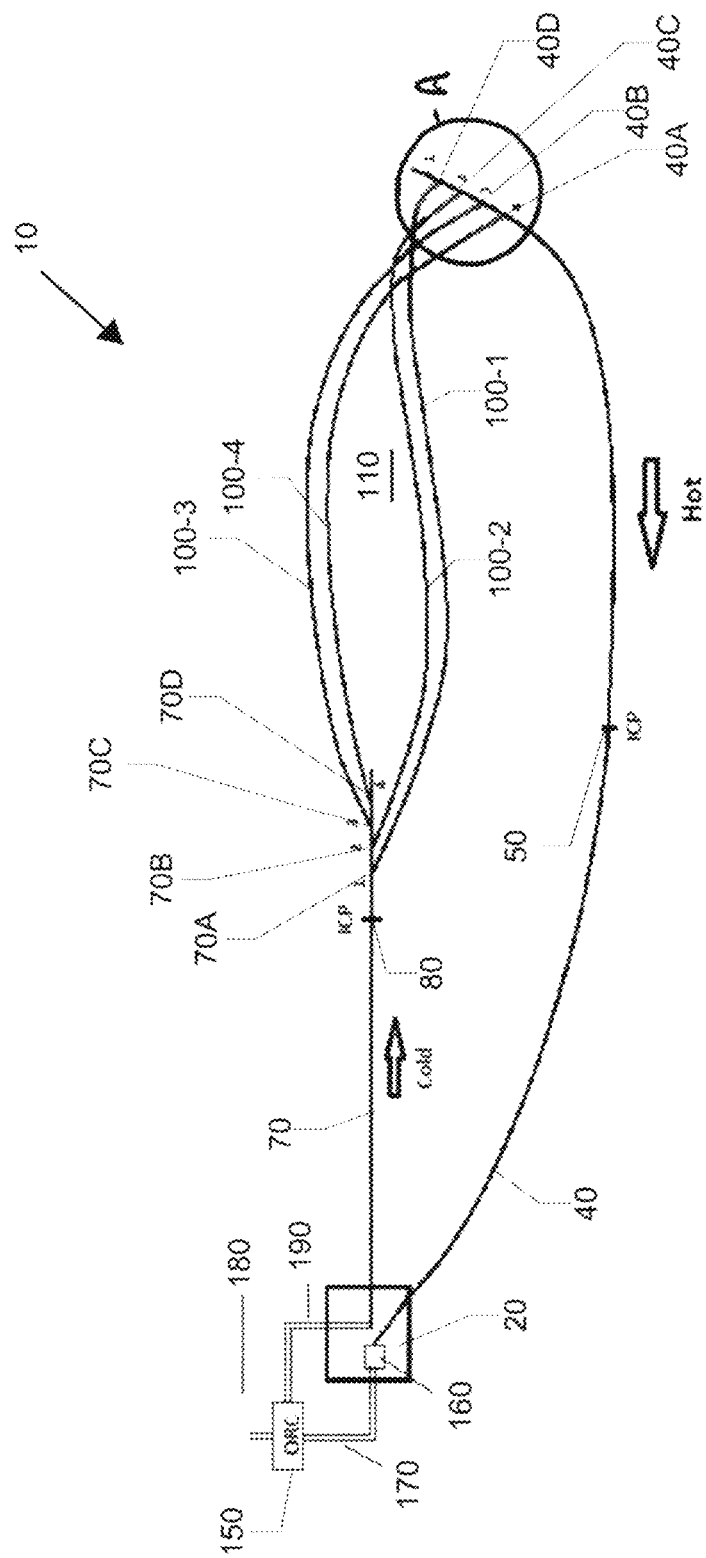
FIG. 14 is a plan view of a closed-loop well system of the present disclosure (Embodiment 1B).
Figure 15:
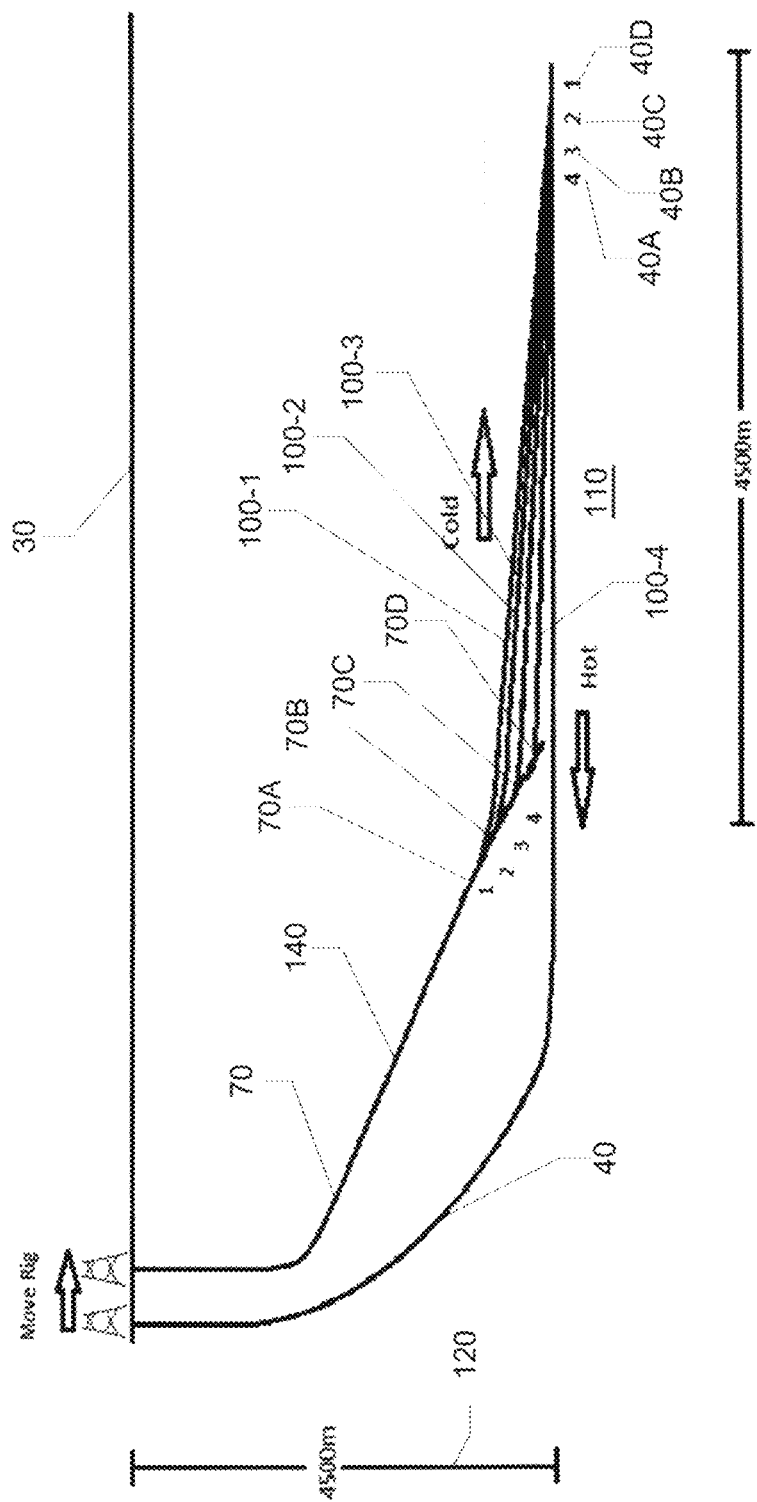
FIG. 15 is a side cross-section view of the closed-loop well system of FIG. 14.
Figure 16:
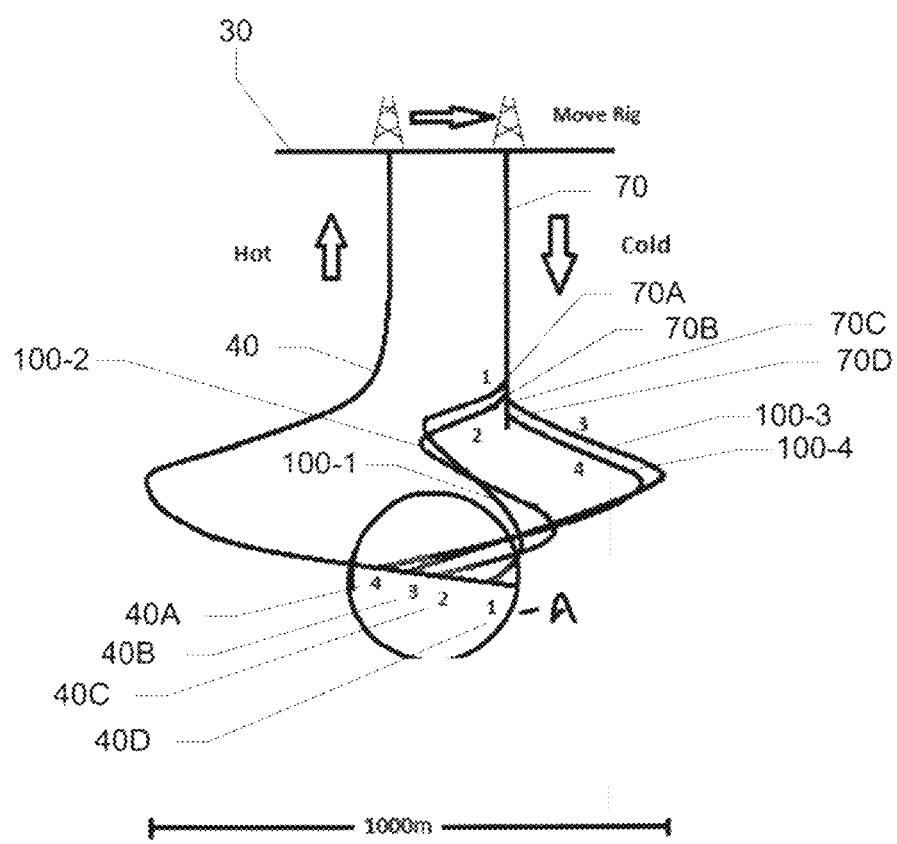
FIG. 16 is a head on cross-section view of the closed-loop well system of FIG. 14.

Referring to FIGS. 14-16 (Embodiment 1B), a general schematic illustrates some options for using the heat extracted from the subterranean geothermal formation. The recovered thermal energy may be used for a variety of purposes. For example dependent on one or more of the temperature and/or quantity and/or user need(s) and/or economics and/or other factor(s). Thermal energy of the loop working fluid may, for example, be used for thermal energy processes and/or may be used for heating, such as heating a greenhouse.

In an embodiment disclosed, the working fluid, heated in the loop, may be used directly as thermal energy for district heating, e.g. the heated working fluid conveyed by pipeline 180 to/from the user, such as a town or greenhouse, and then returned to the loop by pipeline 190. In an embodiment disclosed, the working fluid, heated in the loop, and a district heating fluid are isolated from one another, and the district heating fluid is heated by the working fluid via heat exchanger 160 and the district heating fluid conveyed by pipeline 180 to/from the user, such as a town or greenhouse, and then returned to the heat exchanger 160 for reheating by the working fluid. In an embodiment disclosed, use of the thermal energy may include a thermal process, such as an Organic Rankine Cycle (ORC) system 150. In such embodiment, if an ORC system 150 or other thermodynamic system is present, the loop working fluid would remain isolated from and not touch/mix with the ORC system fluid. The working fluid, after passing through the heat exchanger 160 could be used for example as above. In an embodiment disclosed a further heat exchanger may be used to heat a district heating fluid for district heating for example as above and/or combinations thereof. If no ORC system 150 is installed, e.g. no electricity production, just thermal energy/heat use, the loop working fluid could be used directly in the district heating pipe line 180. These are only a few examples, shown in association with the closed-loop well system of the present disclosure, for example as shown in FIGS. 1-10.

In an embodiment disclosed, the thermal energy of the working fluid, proximity of user, and other factors may influence the design. In an embodiment disclosed, for example, thermal energy of 120° C. may be more suitable for thermal energy processes.

In addition, FIG. 14 illustrates heat in hot heat transfer loop solution may be provided to an Organic Rankine Cycle (ORC) system 150 via a heat exchanger 160 and pipeline 170 to the ORC system 150. The thermal energy may be used for district heating, such as by delivering heated fluid by a pipeline 180 to a nearby user, such as a town for district heating or for example greenhouse, hydroponics, aquaculture or combinations thereof. Fluid from the ORC system 150 may be returned to the heat exchanger 160 for reheating and the process repeated. The ORC system may use heated fluid to expand a gas with a low boiling point to spin a turbine and create electricity, excess thermal energy that is not used up by the ORC can then be sent via heated water through pipeline 180 into town for district heating as described above.

In the Figs., an ORC system 150 is illustrated in simplified form. Hot loop working fluid passes through the closed loop system to the heat exchanger 160 to heat up an isolated fluid (isolated from the loop working fluid), this isolated heated fluid is then piped to the ORC system 150 via pipeline 170, where the thermal energy in the isolated fluid is used. The heat may be used for district heating as described, without creating electricity, or it may be used, for example to expand a gas to drive a turbine to create electricity in the ORC system 150 or other thermodynamic process. As an example, the isolated fluid may comprise water. There may remain some thermal energy in the water isolated fluid, e.g. water after it has been used by the ORC, and this fluid, e.g. water can be sent to a nearby heating user, such as a town for district heating and/or industrial or commercial user for process or other heating by pipeline 180. The remaining isolated water not used by the ORC system 150 or heating may be sent downhole for reheating via return down flow line 190 if the loop working fluid was used or returned to the heat exchanger 160 for reheating if the isolated fluid was used.

In an embodiment disclosed, the loop working fluid may be used directly to drive a thermodynamic process, for example ORC system 150, or the loop working fluid may be provided to pipeline 180 for district heating as described above. In an embodiment disclosed, the loop working fluid may be used indirectly to heat an intermediate, isolated fluid, and the isolated fluid used to drive a thermodynamic process, for example ORC system 150, or the isolated fluid may be provided to pipeline 180 for district heating as described above. The thermal energy of the loop working fluid may be used directly and/or indirectly.

Any dimensions shown are mere examples, and illustrative of but one embodiment disclosed, e.g. 4500 m TVD and 4500 m length of FIGS. 15, and 1000 m of FIG. 16.

Example 7

Figure 17:
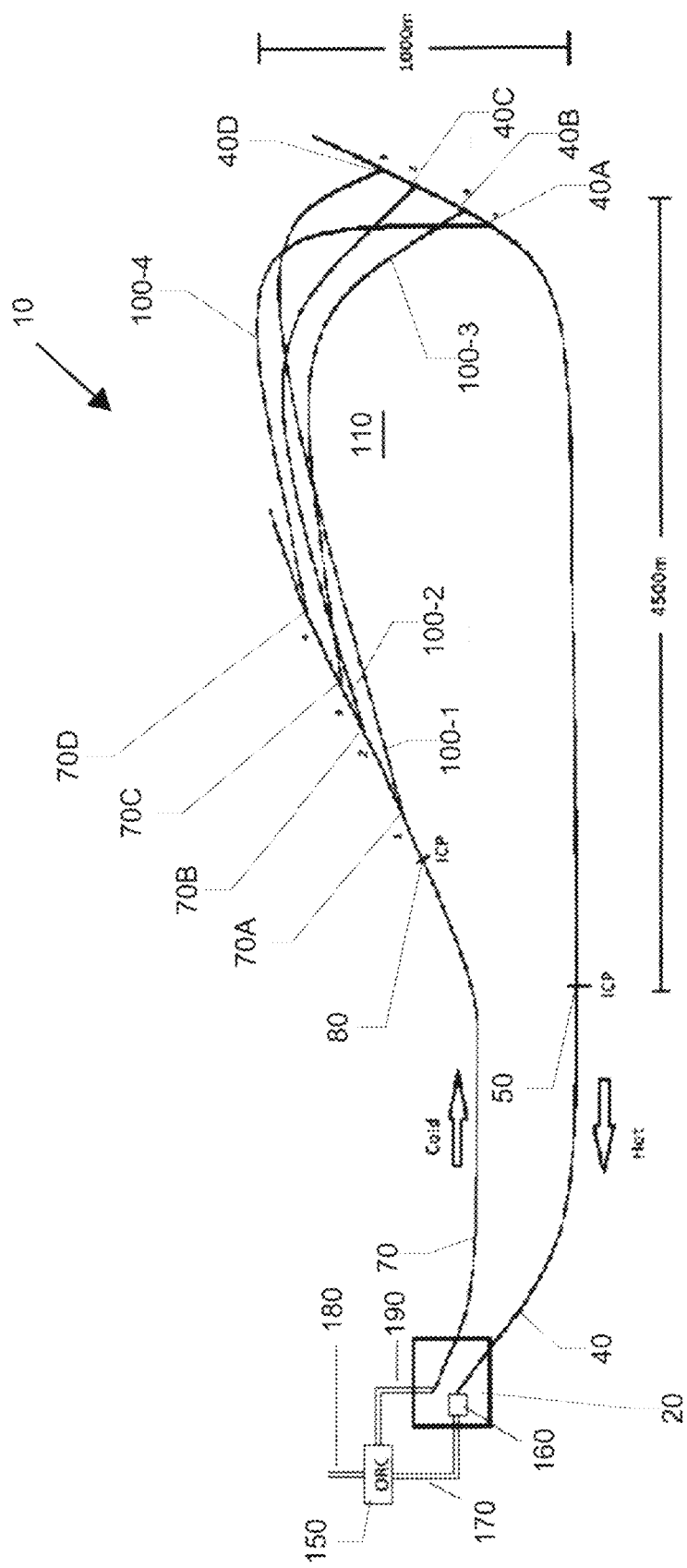
FIG. 17 is a plan view of a closed-loop well system of the present disclosure (Embodiment 2A).
Figure 18:
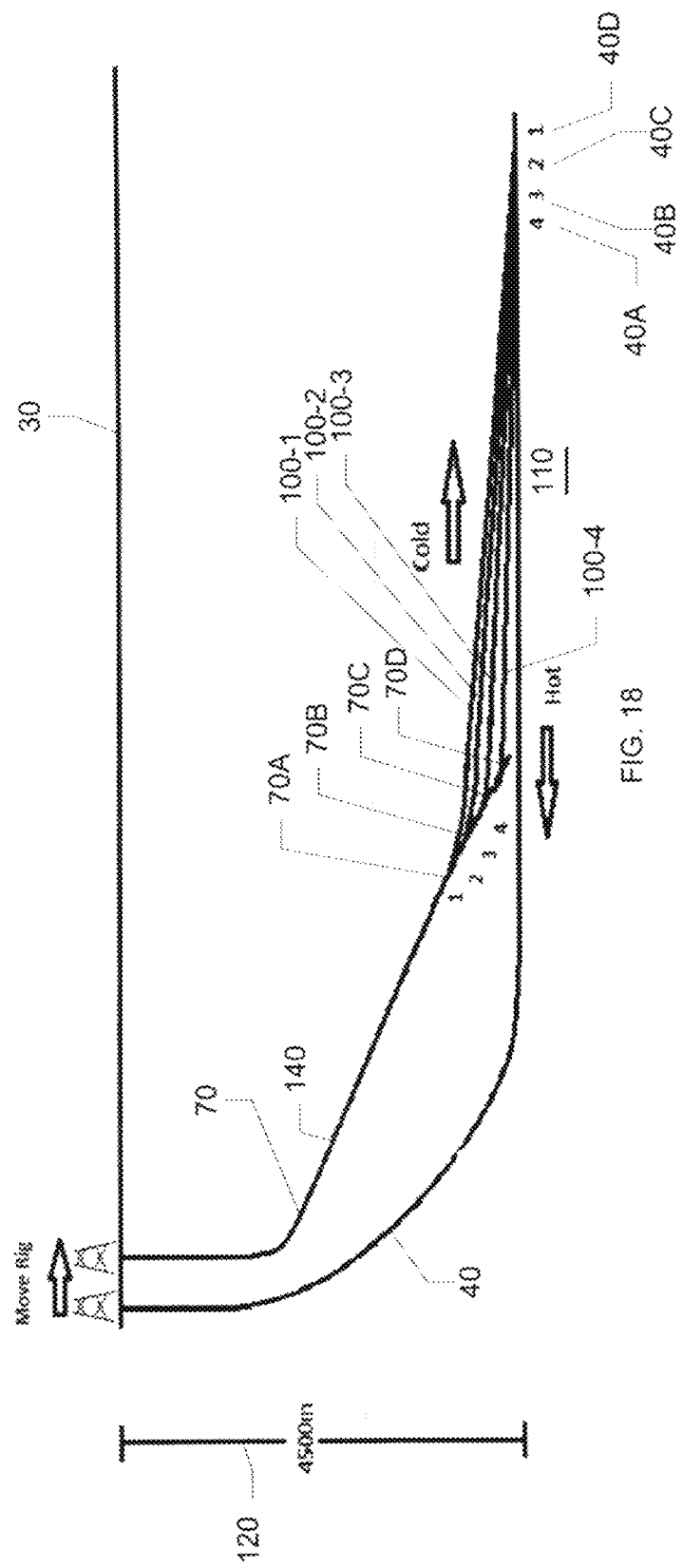
FIG. 18 is a side cross-section view of the closed-loop well system of FIG. 17.
Figure 19:
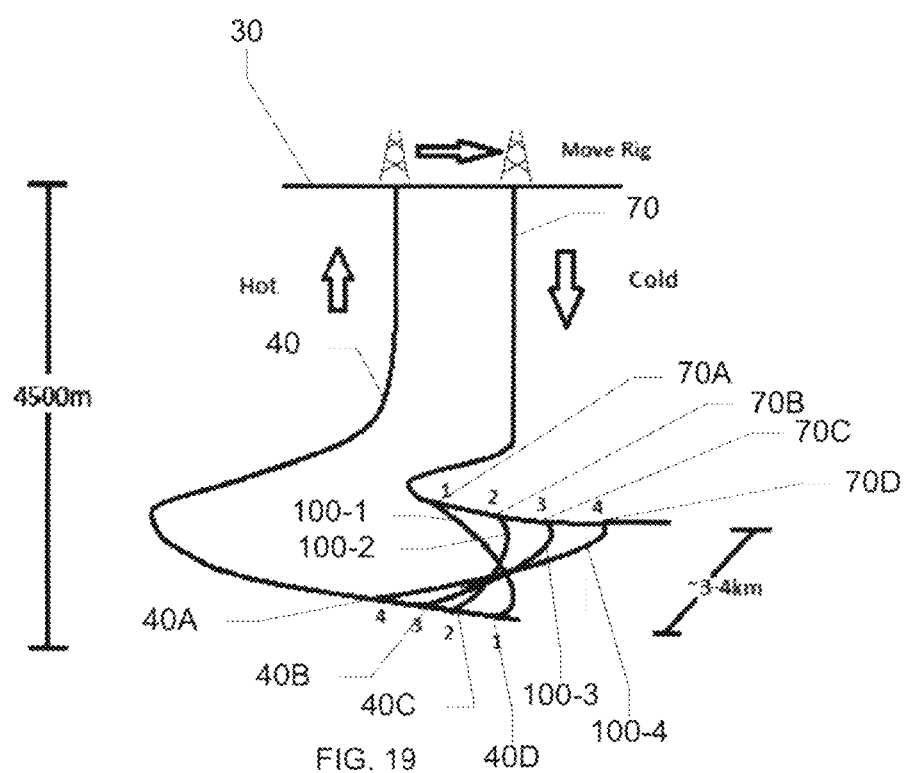
FIG. 19 is a head on cross-section view of the closed-loop well system of FIG. 17.

Referring to FIGS. 17-19 (Embodiment 2A), a general schematic illustrates some options for using the heat extracted from the subterranean geothermal formation. The recovered thermal energy may be used for a variety of purposes. For example dependent on one or more of the temperature and/or quantity and/or user need(s) and/or economics and/or other factor(s). Thermal energy of the loop working fluid may, for example, be used for thermal energy processes and/or may be used for heating, such as heating a greenhouse.

In an embodiment disclosed, the working fluid, heated in the loop, may be used directly as thermal energy for district heating, e.g. the heated working fluid conveyed by pipeline 180 to/from the user, such as a town or greenhouse, and then returned to the loop by pipeline 190. In an embodiment disclosed, the working fluid, heated in the loop, and a district heating fluid are isolated from one another, and the district heating fluid is heated by the working fluid via heat exchanger 160 and the district heating fluid conveyed by pipeline 180 to/from the user, such as a town or greenhouse, and then returned to the heat exchanger 160 for reheating by the working fluid. In an embodiment disclosed, use of the thermal energy may include a thermal process, such as an Organic Rankine Cycle (ORC) system 150. In such embodiment, if an ORC system 150 or other thermodynamic system is present, the loop working fluid would remain isolated from and not touch/mix with the ORC system fluid. The working fluid, after passing through the heat exchanger 160 could be used for example as above. In an embodiment disclosed a further heat exchanger may be used to heat a district heating fluid for district heating for example as above and/or combinations thereof. If no ORC system 150 is installed, e.g. no electricity production, just thermal energy/heat use, the loop working fluid could be used directly in the district heating pipe line 180. These are only a few examples, shown in association with the closed-loop well system of the present disclosure, for example as shown in FIGS. 1-10.

In an embodiment disclosed, the thermal energy of the working fluid, proximity of user, and other factors may influence the design. In an embodiment disclosed, for example, thermal energy of 120° C. may be more suitable for thermal energy processes.

In addition, FIG. 17 illustrates heat in hot heat transfer loop solution may be provided to an Organic Rankine Cycle (ORC) system 150 via a heat exchanger 160 and pipeline 170 to the ORC system 150. The thermal energy may be used for district heating, such as by delivering heated fluid by a pipeline 180 to a nearby user, such as a town for district heating or for example greenhouse, hydroponics, aquaculture or combinations thereof. Fluid from the ORC system 150 may be returned to the heat exchanger 160 for reheating and the process repeated. The ORC system may use heated fluid to expand a gas with a low boiling point to spin a turbine and create electricity, excess thermal energy that is not used up by the ORC can then be sent via heated water through pipeline 180 into town for district heating as described above.

In the Figs., an ORC system 150 is illustrated in simplified form. Hot loop working fluid passes through the closed loop system to the heat exchanger 160 to heat up an isolated fluid (isolated from the loop working fluid), this isolated heated fluid is then piped to the ORC system 150 via pipeline 170, where the thermal energy in the isolated fluid is used. The heat may be used for district heating as described, without creating electricity, or it may be used, for example to expand a gas to drive a turbine to create electricity in the ORC system 150 or other thermodynamic process. As an example, the isolated fluid may comprise water. There may remain some thermal energy in the water isolated fluid, e.g. water after it has been used by the ORC, and this fluid, e.g. water can be sent to a nearby heating user, such as a town for district heating and/or industrial or commercial user for process or other heating by pipeline 180. The remaining isolated water not used by the ORC system 150 or heating may be sent downhole for reheating via return down flow line 190 if the loop working fluid was used or returned to the heat exchanger 160 for reheating if the isolated fluid was used.

In an embodiment disclosed, the loop working fluid may be used directly to drive a thermodynamic process, for example ORC system 150, or the loop working fluid may be provided to pipeline 180 for district heating as described above. In an embodiment disclosed, the loop working fluid may be used indirectly to heat an intermediate, isolated fluid, and the isolated fluid used to drive a thermodynamic process, for example ORC system 150, or the isolated fluid may be provided to pipeline 180 for district heating as described above. The thermal energy of the loop working fluid may be used directly and/or indirectly.

Any dimensions shown are mere examples, and illustrative of but one embodiment disclosed, e.g. 4500 m and 1000 m of FIG. 17, 4500 m of FIGS. 18, and 4500 m of FIG. 19.

Example 8

Figure 20:
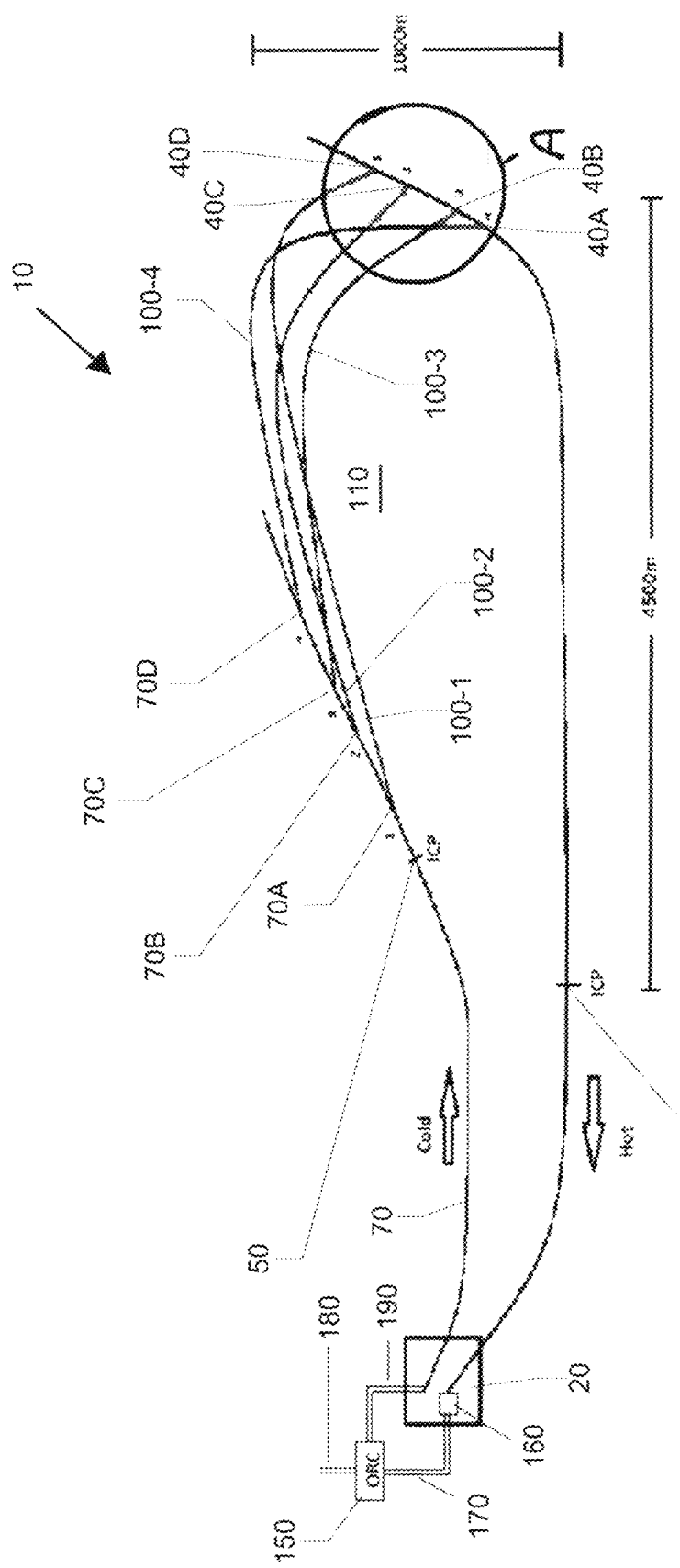
FIG. 20 is a plan view of a closed-loop well system of the present disclosure (Embodiment 2B).
Figure 21:
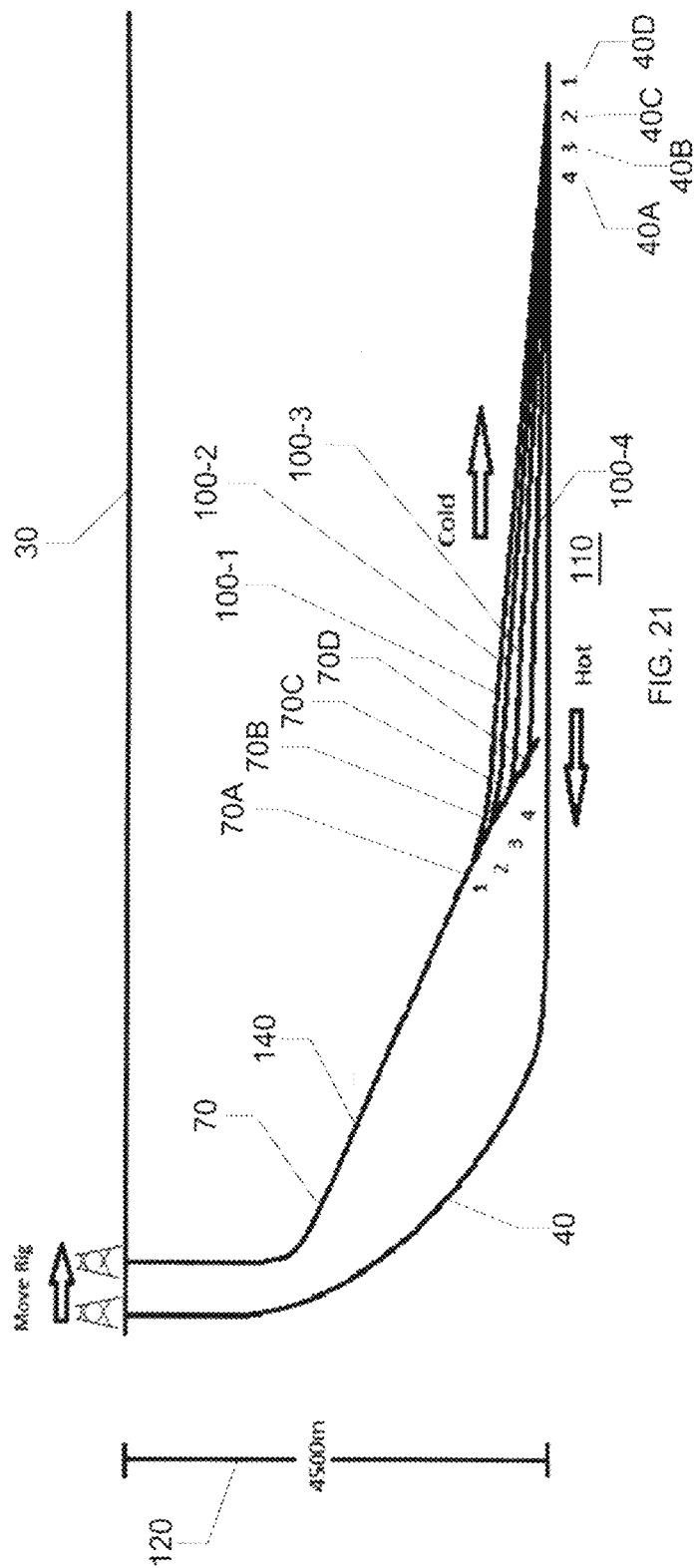
FIG. 21 is a side cross-section view of the closed-loop well system of FIG. 20.
Figure 22:
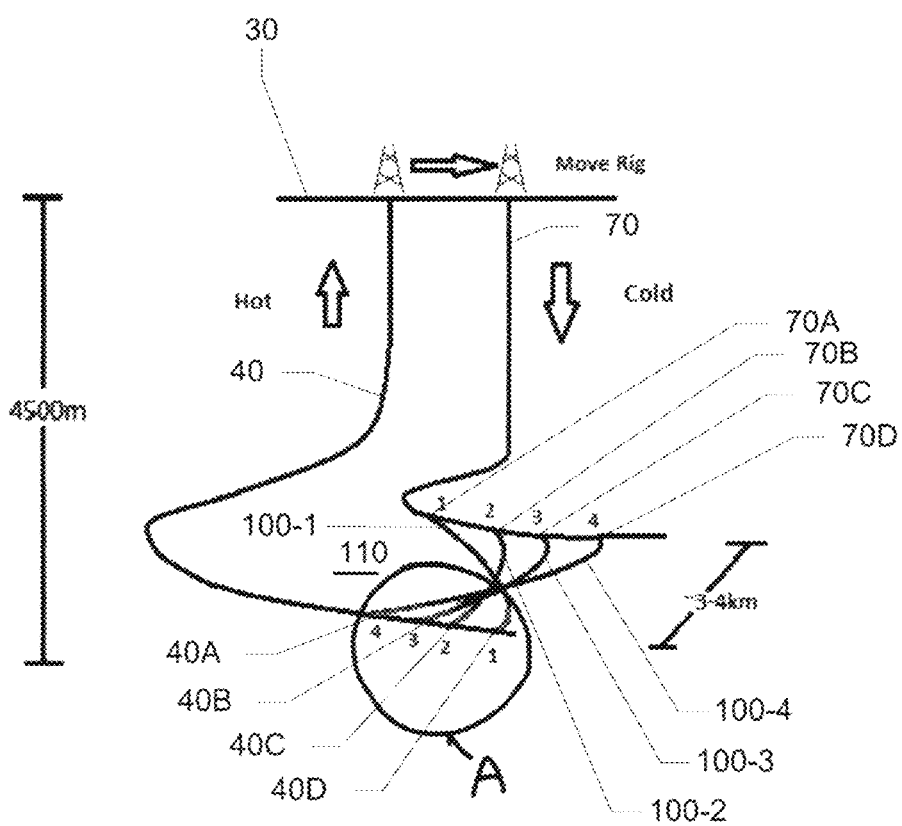
FIG. 22 is a head on cross-section view of the closed-loop well system of FIG. 20.
Figure 23:
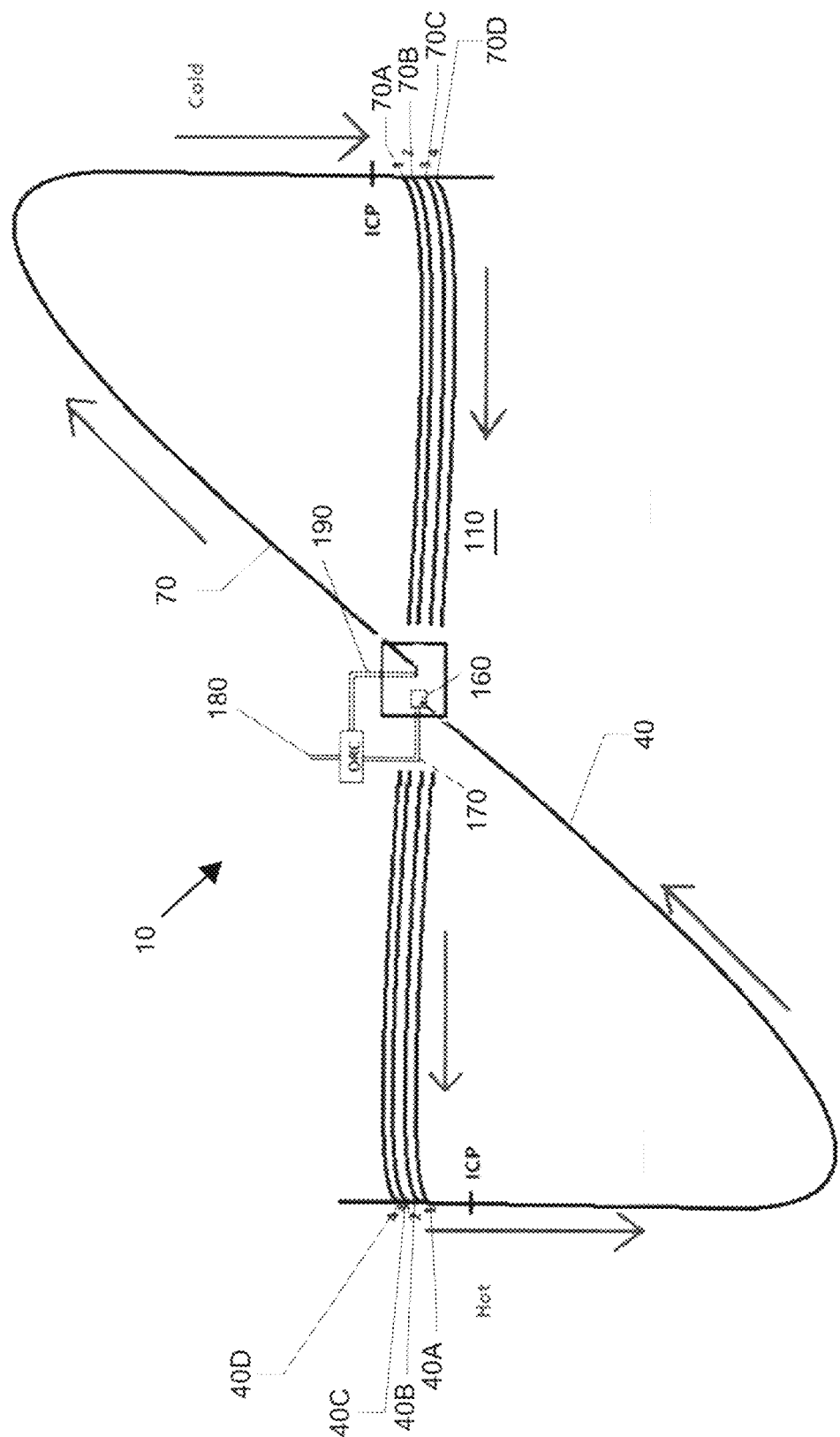
FIG. 23 is a plan view of a closed-loop well system (Embodiment 3).

Referring to FIGS. 20-22 (Embodiment 2B), a general schematic illustrates some options for using the heat extracted from the subterranean geothermal formation. The recovered thermal energy may be used for a variety of purposes. For example dependent on one or more of the temperature and/or quantity and/or user need(s) and/or economics and/or other factor(s). Thermal energy of the loop working fluid may, for example, be used for thermal energy processes and/or may be used for heating, such as heating a greenhouse.

In an embodiment disclosed, the working fluid, heated in the loop, may be used directly as thermal energy for district heating, e.g. the heated working fluid conveyed by pipeline 180 to/from the user, such as a town or greenhouse, and then returned to the loop by pipeline 190. In an embodiment disclosed, the working fluid, heated in the loop, and a district heating fluid are isolated from one another, and the district heating fluid is heated by the working fluid via heat exchanger 160 and the district heating fluid conveyed by pipeline 180 to/from the user, such as a town or greenhouse, and then returned to the heat exchanger 160 for reheating by the working fluid. In an embodiment disclosed, use of the thermal energy may include a thermal process, such as an Organic Rankine Cycle (ORC) system 150. In such embodiment, if an ORC system 150 or other thermodynamic system is present, the loop working fluid would remain isolated from and not touch/mix with the ORC system fluid. The working fluid, after passing through the heat exchanger 160 could be used for example as above. In an embodiment disclosed a further heat exchanger may be used to heat a district heating fluid for district heating for example as above and/or combinations thereof. If no ORC system 150 is installed, e.g. no electricity production, just thermal energy/heat use, the loop working fluid could be used directly in the district heating pipe line 180. These are only a few examples, shown in association with the closed-loop well system of the present disclosure, for example as shown in FIGS. 1-10.

In an embodiment disclosed, the thermal energy of the working fluid, proximity of user, and other factors may influence the design. In an embodiment disclosed, for example, thermal energy of 120° C. may be more suitable for thermal energy processes.

In addition, FIG. 20 illustrates heat in hot heat transfer loop solution may be provided to an Organic Rankine Cycle (ORC) system 150 via a heat exchanger 160 and pipeline 170 to the ORC system 150. The thermal energy may be used for district heating, such as by delivering heated fluid by a pipeline 180 to a nearby user, such as a town for district heating or for example greenhouse, hydroponics, aquaculture or combinations thereof. Fluid from the ORC system 150 may be returned to the heat exchanger 160 for reheating and the process repeated. The ORC system may use heated fluid to expand a gas with a low boiling point to spin a turbine and create electricity, excess thermal energy that is not used up by the ORC can then be sent via heated water through pipeline 180 into town for district heating as described above.

In the Figs., an ORC system 150 is illustrated in simplified form. Hot loop working fluid passes through the closed loop system to the heat exchanger 160 to heat up an isolated fluid (isolated from the loop working fluid), this isolated heated fluid is then piped to the ORC system 150 via pipeline 170, where the thermal energy in the isolated fluid is used. The heat may be used for district heating as described, without creating electricity, or it may be used, for example to expand a gas to drive a turbine to create electricity in the ORC system 150 or other thermodynamic process. As an example, the isolated fluid may comprise water. There may remain some thermal energy in the water isolated fluid, e.g. water after it has been used by the ORC, and this fluid, e.g. water can be sent to a nearby heating user, such as a town for district heating and/or industrial or commercial user for process or other heating by pipeline 180. The remaining isolated water not used by the ORC system 150 or heating may be sent downhole for reheating via return down flow line 190 if the loop working fluid was used or returned to the heat exchanger 160 for reheating if the isolated fluid was used.

In an embodiment disclosed, the loop working fluid may be used directly to drive a thermodynamic process, for example ORC system 150, or the loop working fluid may be provided to pipeline 180 for district heating as described above. In an embodiment disclosed, the loop working fluid may be used indirectly to heat an intermediate, isolated fluid, and the isolated fluid used to drive a thermodynamic process, for example ORC system 150, or the isolated fluid may be provided to pipeline 180 for district heating as described above. The thermal energy of the loop working fluid may be used directly and/or indirectly.

Any dimensions shown are mere examples, and illustrative of but one embodiment disclosed, e.g. 4500 m and 1000 m of FIG. 20, 4500 m of FIGS. 21, and 4500 m of FIG. 22.

Example 9

Referring to FIGS. 23-26 (Embodiment 3), from a well pad 20, a first well 40 may be drilled down to the formation TVD and landed at ~90 degrees with directional drilling tools in a curved hook fashion. The first well 40 may be cased to this point, the first well ICP 50.

After casing, the first well 40 may be drilled out and holding at ~90 degrees and a retrievable, open hole whipstock may be set at a fourth circuit connection point, region 40D and a sidetrack, for example about ~100-500 m drilled to facilitate magnetic ranging connection. The whipstock may then be retrieved and moved to a third circuit connection point, region 40C and the procedure repeated, and then continued for a second circuit connection point, region 40B and then a first circuit connection point, region 40A.

A second well 70 may then be drilled in a similar curved hook fashion to ~90 degrees, substantially parallel to the first well 40 and in the opposite direction, with a well separation 130 between the first well 40 and the second well 70 of, for example, ~4500 m. The second well 70 may then be cased to its ICP, second well ICP 80. After drilling out the second well 70, an ~90 degree inclination 140 may be maintained to TD. An open hole, retrievable whipstock may then be set at a fourth circuit sidetrack point, region 70D and a fourth circuit 100-4 may be drilled towards the first well 40 and connected with magnetic ranging tools, region 40A. Again, as mentioned above, use of n=4 is merely an example, and the number of circuits 100 of the present disclosure is n, and so this would start with the nth circuit. If, for example, the number of circuits 100 was eleven, then one would start with the 11$^{th}$ circuit, not the 4$^{th}$. Continuing on, with this n=4 example, the open hole, retrievable whipstock may be retrieved and moved to the third circuit sidetrack point, region 70C and the procedure may continue for a third circuit 100-3, a second circuit 100-2, and then a first circuit 100-1. After drilling each circuit, a calculation and/or measurement and/or other determination may be made to determine the volume within the circuit 100, a string hole opener will be used to open up parts of each circuit to match within a selected variance, such as for example ~10 percent or less the volume of the fourth circuit 100-4 (i.e. the first circuit completed).

Changing directions while drilling may require some distance/length of wellbore in order to make the transition. In an embodiment disclosed, the trajectory of the first well and/or the second well may follow a curved hook trajectory, where the well is drilled from the well pad in a direction away from a geothermal source target region of the formation for a distance and/or to a depth and then back and through the target region. In an embodiment disclosed, both the first well and the second well follow a curved hook trajectory, e.g. as in FIG. 25. This, for example may be used when the well pad is placed about centrally above the geothermal source target region, and may, for example increase the capacity for the number of circuits that may be drilled and/or the contact area/volume between the circuits and the geothermal source. In an embodiment disclosed, for example, use of a curved hook trajectory may allow more circuits to be drilled compared to a vertical to lateral trajectory. In an embodiment disclosed, for example, use of a curved hook trajectory may allow for 8-10 or more circuits.

Figure 24:
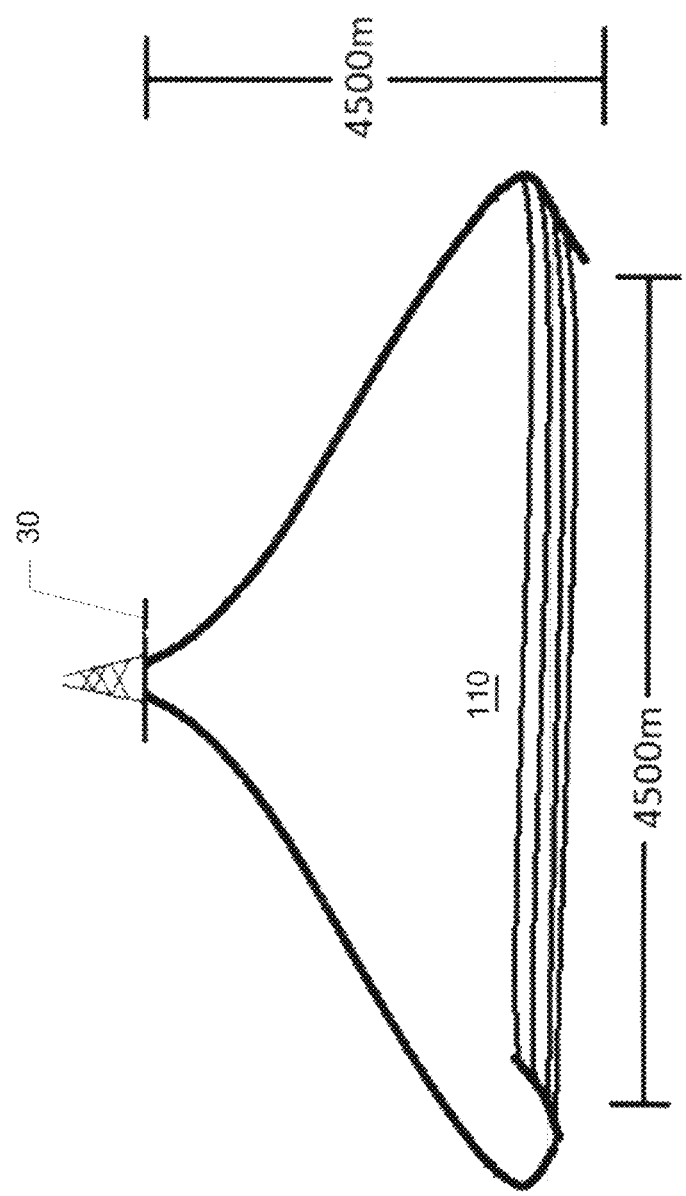
FIG. 24 is a side cross-section view of the closed-loop well system of FIG. 23.
Figure 25:
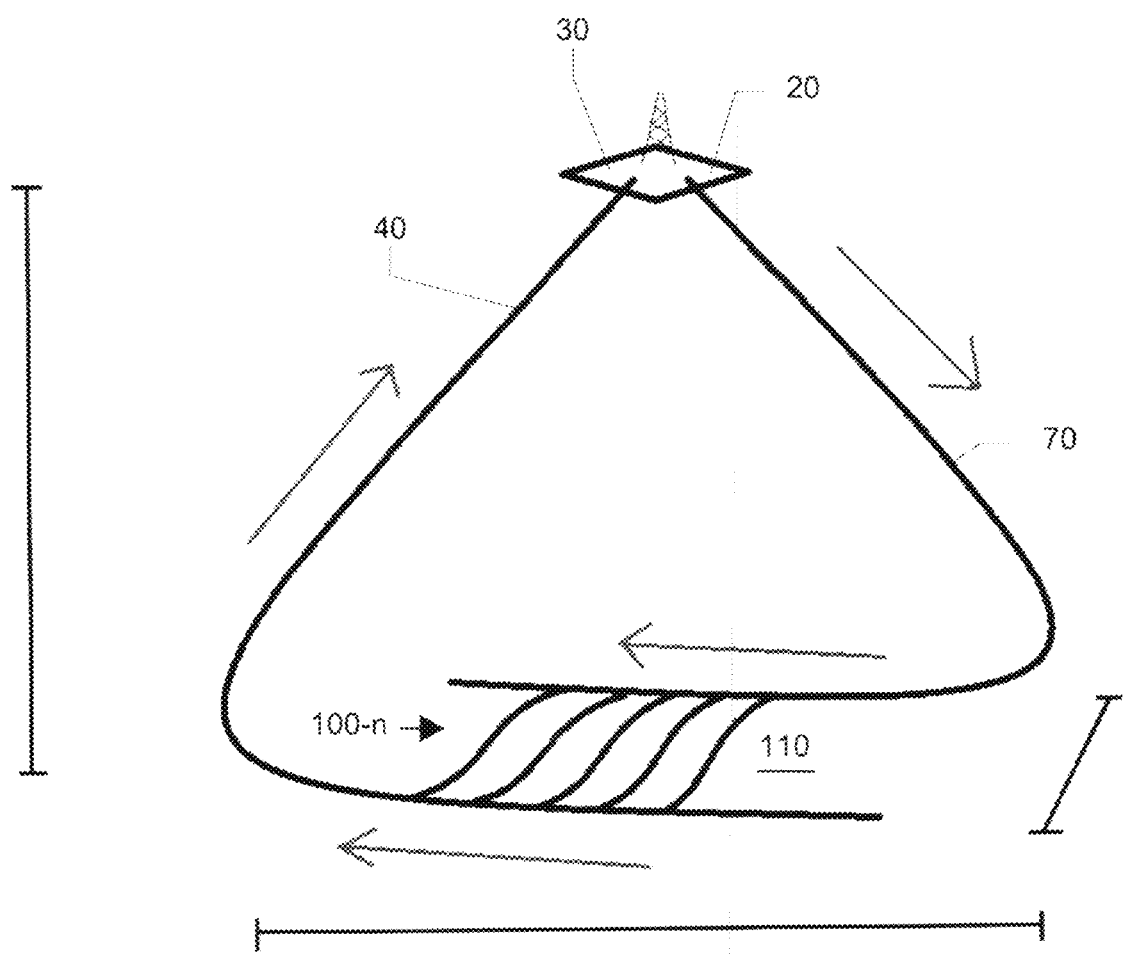
FIG. 25 is a head on cross-section view of the closed-loop well system of FIG. 23.
Figure 26:
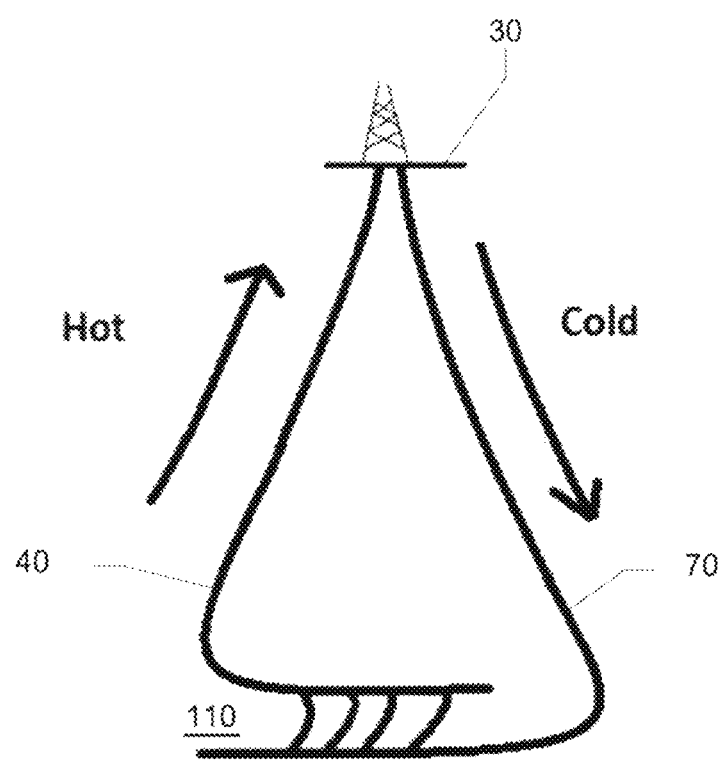
FIG. 26 is a cross-section perspective view of the closed-loop well system of FIG. 23.

Any dimensions shown are mere examples, and illustrative of but one embodiment disclosed, e.g. 4500 m and 4500 m of FIG. 24.

ADDITIONAL EMBODIMENTS

In some aspects, the disclosure relates to geothermal systems and related methods according to the following Embodiments, among others:

Embodiment 1. A system comprising a) a first wellbore extending from a surface to a subterranean geothermal formation, the first wellbore comprising a lateral section in the subterranean formation; b) a second wellbore extending from the surface to the subterranean geothermal formation, the second wellbore comprising a lateral section in the subterranean geothermal formation; c) a plurality of open hole circuits extending between the lateral section of the first wellbore and the lateral section of the second wellbore; wherein the first wellbore, the second wellbore and the plurality of circuits form a substantially sealed closed loop; and wherein the plurality of circuits are balanced.

Embodiment 2. The system of Embodiment 1, wherein the plurality of circuits comprises one or more of: a) substantially equal circuit velocity; b) substantially equal circuit pressure drop; c) substantially equal circuit length; d) substantially equal circuit volume; e) substantially equal resistance, ΔP/flow rate; and f) combinations thereof.

Embodiment 3. The system of Embodiment 1 or 2, wherein a circuit parameter of the plurality of circuits substantially match.

Embodiment 4. The system of Embodiment 3, wherein the circuit parameter comprises one or more of: a) circuit fluid velocity; b) circuit pressure drop; c) circuit length; d) circuit volume; e) resistance, ΔP/flow rate; and f) combinations thereof.

Embodiment 5. The system of Embodiment 3 or 4, wherein the circuit parameter comprises circuit fluid velocity and circuit length.

Embodiment 6. The system of any one of Embodiments 1 to 5, wherein the plurality of open hole circuits connect the first wellbore and the second wellbore in a first out/last in configuration, wherein flow across the plurality of open hole circuits is balanced.

Embodiment 7. The system of any one of Embodiments 1 to 6, further comprising a heat exchange, adapted to extract thermal energy from a working fluid circulated through the plurality of open hole circuits.

Embodiment 8. A method comprising: providing a first wellbore extending from a surface to a subterranean geothermal formation, the first wellbore comprising a lateral section in the subterranean formation; providing a second wellbore extending from the surface to the subterranean geothermal formation, the second wellbore comprising a lateral section in the subterranean geothermal formation; providing a plurality of open hole circuits extending between the lateral section of the first wellbore and the lateral section of the second wellbore; wherein the first wellbore, the second wellbore and the plurality of circuits form a substantially sealed closed loop; and wherein the plurality of circuits are balanced, and circulating a working fluid through the substantially sealed closed loop in order to convey thermal energy from the subterranean geothermal formation to the surface.

Embodiment 9. The method of Embodiment 8, wherein the plurality of circuits comprises one or more of: a) substantially equal circuit fluid velocity; b) substantially equal circuit pressure drop; c) substantially equal circuit length; d) substantially equal circuit volume; e) substantially equal resistance, ΔP/flow rate; and f) combinations thereof.

Embodiment 10. The method of Embodiment 8 or 9, further comprising calculating a circuit parameter of a first circuit of the plurality of circuits, and adapting each of the remaining circuits of the plurality of circuits to substantially match the circuit parameter.

Embodiment 11. The method of Embodiment 10, wherein the circuit parameter comprises one or more of: a) circuit fluid velocity; b) circuit pressure drop; c) circuit volume; d) circuit length; e) circuit resistance, ΔP/flow rate; and f) combinations thereof.

Embodiment 12. The method of Embodiment 8 or 9, further comprising calculating a circuit parameter of a first circuit of the plurality of circuits, and modifying each of the remaining circuits of the plurality of circuits to substantially match the circuit parameter.

Embodiment 13. The method of Embodiment 12, wherein the circuit parameter comprises one or more of: a) circuit fluid velocity; b) circuit pressure drop; c) circuit length; d) circuit volume;) circuit resistance, ΔP/flow rate; and f) combinations thereof.

Embodiment 14. The method of Embodiment 12 or 13, wherein modifying each of the remaining circuits of the plurality of circuits comprises enlarging at least a portion of at least one of the plurality of circuits.

Embodiment 15. The method of any one of Embodiments 8 to 14, wherein the working fluid is at least partially circulated by a thermosiphon effect.

Embodiment 16. The method of any one of Embodiments 8 to 15, further comprising using at least a portion of the thermal energy to provide heating to a user.

Embodiment 17. The method of any one of Embodiments 8 to 16, further comprising generating electricity using at least a portion of the thermal energy.

Embodiment 18. The method of Embodiment 11 or 13, wherein the circuit parameter comprises circuit fluid velocity and circuit length.

Embodiment 19. The method of any one of Embodiments 8 to 18, further comprising connecting the first wellbore and the second wellbore with the plurality of open hole circuits in a first out/last in configuration.

Embodiment 20. The method of any one of Embodiments 8 to 19, wherein flow across the plurality of open hole circuits is balanced.

In an embodiment disclosed, all circuits connecting the supply and return vertical headers may be of substantially equal length, substantially equal varying diameters, substantially equal resistance, and configured in a "first out of supply well-last in to return well" configuration forcing substantially equal fluid flow rates through all circuits whether that be 2 or 10 or any number, n of circuits connected as described herein. In an embodiment disclosed, said feature(s) may be combined with any one of Embodiments 1 to 20.

In an embodiment disclosed, substantially equal flow of working fluid may be provided across all circuits between the supply and the return vertical headers. In an embodiment disclosed, said feature(s) may be combined with any one of Embodiments 1 to 20.

In an embodiment disclosed, a Reynolds number of 2500 or more may provide improved or optimum thermal transfer if relevant conditions within each circuit are substantially equal, for example within about +/−15 percent or about +/−10 percent. In an embodiment disclosed, said feature(s) may be combined with any one of Embodiments 1 to 20.

In an embodiment disclosed, the need to know adequate information about each circuit to calculate (best practices) the necessary information from the circuit (as built information) to accurately predict flow rates required to optimize thermal transfer across all circuits. In an embodiment disclosed, said feature(s) may be combined with any one of Embodiments 1 to 20.

Knowing all circuit volumes and through flow velocities are equal may allow for accurate modeling of formation thermal transmissivity. Also, by altering the wellbore diameter with the string hole-opener, it may increase the Reynolds number (a dimensionless number) and therefore may also increase the thermal transmissivity. In an embodiment disclosed, said feature(s) may be combined with any one of Embodiments 1 to 20.

The increased formation contact area may allow more efficient production of thermal energy.

In an embodiment disclosed, by drilling from the same location (well pad), a project can be scalable, allowing formation contact in all compass directions rather than being limited to north-south or east-west. A single location may also allow for a large reduction in Capital Expenditure (CAPEX) by only requiring a single facility at the well pad and no temporary infrastructure. For example, from the well pad, a plurality of closed-loop well systems as described herein may be provided, extending outward from the well pad in a plurality of directions, to a plurality of depths, to a plurality of lengths, and/or combinations thereof. In an embodiment disclosed, said feature(s) may be combined with any one of Embodiments 1 to 20.

The design of the disclosed balanced loop may allow the targeting of narrow heat bearing formations that are dry. In an embodiment disclosed, said feature(s) may be combined with any one of Embodiments 1 to 20.

The design may optimize the amount of extractable heat from a formation to improve the economics of geothermal energy from low-medium enthalpy formations. In an embodiment disclosed, said feature(s) may be combined with any one of Embodiments 1 to 20.

The terms "heat transfer fluid" or "heat transfer solution" are used herein broadly and interchangeably to refer to any fluid that may be conveyed through the loop in order to transfer heat from the geothermal formation to the surface. Examples include, but are not limited to water, water/glycol, and supercritical $CO_2$.

The terms "circuit" or "leg" or "lateral" are used herein broadly and interchangeably to refer to any open hole conduit extending at least partially through the geothermal formation between the first well and the second well, between circuits, or both.

The term "resistance" or "circuit resistance" are used herein broadly to refer to the change in pressure divided by the flow rate, $\Delta P$/flow rate.

In an embodiment disclosed, the second well may be used as a supply and the first well may be used as a return. The supply may also be referred to as "cold" and the return may also be referred to as "hot". In such embodiment, referring to the Figs., the second well is "cold" and the first well is "hot". In an embodiment disclosed, the first well may be used as the supply and the second well may be used as the return. In an embodiment disclosed, said feature(s) may be combined with any one of Embodiments 1 to 20.

In an embodiment disclosed, the first well and/or the second well may be substantially vertical at the surface, extend substantially vertically for a vertical portion to a depth, which may differ between the first well and the second well, and then transition to a substantially horizontal or slanted portion. The transition may use techniques known to a person skilled in the art, and for example, but not limited to a lateral portion extending from the vertical portion or a continuation of the vertical portion to the horizontal or slanted portion using directional drilling to build from vertical to horizontal. At least a portion of the plurality of circuits may be substantially horizontal through at least a portion of the subterranean geothermal formation.

In the preceding description, for purposes of explanation, numerous details are set forth in order to provide a thorough understanding of the embodiments. However, it will be apparent to one skilled in the art that these specific details are not required. In other instances, well-known structures and processes are shown in block diagram form in order not to obscure the understanding.

The present disclosure provides a system and method for geothermal heat production. A balanced geothermal energy transfer loop may include a first wellbore and a second wellbore extending from surface to a subterranean geothermal formation and a plurality of balanced open hole circuits extending between the first wellbore and the second wellbore through the geothermal formation, forming a substantially sealed closed loop. Each of the plurality of circuits may be designed or modified to have a substantially equal circuit parameter. The circuit parameter may include one or more of circuit fluid velocity, circuit pressure drop, circuit volume and/or circuit length. The circuit parameter may include circuit length and volume, and the circuits connect the supply/return wells in a first out/last in configuration.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A system comprising:
   a. a first wellbore extending from a surface to a subterranean geothermal formation, the first wellbore comprising a lateral section in the subterranean formation;
   b. a second wellbore extending from the surface to the subterranean geothermal formation, the second wellbore comprising a lateral section in the subterranean geothermal formation;
   c. a plurality of open hole circuits extending between the lateral section of the first wellbore and the lateral section of the second wellbore;
   wherein the first wellbore, the second wellbore and the plurality of circuits form a substantially sealed closed loop; and
   wherein the plurality of open hole circuits are balanced, the plurality of open hole circuits comprising one or more of:
   i. substantially equal circuit velocity;
   ii. substantially equal circuit pressure drop;
   iii. substantially equal circuit length
   iv. substantially equal circuit volume;
   v. substantially equal resistance, $\Delta P$/flow rate; and
   vi. combinations thereof.

2. The system of claim 1, wherein a circuit parameter of the plurality of circuits substantially match.

3. The system of claim 2, wherein the circuit parameter comprises one or more of:
   a. circuit fluid velocity;
   b. circuit pressure drop;
   c. circuit length;
   d. circuit volume;
   e. resistance, $\Delta P$/flow rate; and
   f. combinations thereof.

4. The system of claim 3, wherein the circuit parameter comprises circuit fluid velocity and circuit length.

5. The system of claim 1, wherein the plurality of open hole circuits connect the first wellbore and the second wellbore in a first out/last in configuration, wherein flow across the plurality of open hole circuits is balanced.

6. The system of claim 1, further comprising a heat exchange, adapted to extract thermal energy from a working fluid circulated through the plurality of open hole circuits.

7. A method comprising:
   providing a first wellbore extending from a surface to a subterranean geothermal formation, the first wellbore comprising a lateral section in the subterranean formation;
   providing a second wellbore extending from the surface to the subterranean geothermal formation, the second wellbore comprising a lateral section in the subterranean geothermal formation;
   providing a plurality of open hole circuits extending between the lateral section of the first wellbore and the lateral section of the second wellbore;
   wherein the first wellbore, the second wellbore and the plurality of circuits form a substantially sealed closed loop; and
   circulating a working fluid through the substantially sealed closed loop in order to convey thermal energy from the subterranean geothermal formation to the surface;
   wherein the plurality of open hole circuits are balanced, the plurality of open hole circuits comprising one or more of:
   a. substantially equal circuit fluid velocity;
   b. substantially equal circuit pressure drop;
   C. substantially equal circuit length
   d. substantially equal circuit volume;
   e. substantially equal resistance, $\Delta P$/flow rate; and
   f. combinations thereof.

8. The method of claim 7, further comprising calculating a circuit parameter of a first circuit of the plurality of circuits, and adapting each of the remaining circuits of the plurality of circuits to substantially match the circuit parameter.

9. The method of claim 8, wherein the circuit parameter comprises one or more of:
   a. circuit fluid velocity;
   b. circuit pressure drop;
   c. circuit volume;
   d. circuit length;
   e. circuit resistance, ΔP/flow rate; and
   f. combinations thereof.

10. The method of claim 7, further comprising calculating a circuit parameter of a first circuit of the plurality of circuits, and modifying each of the remaining circuits of the plurality of circuits to substantially match the circuit parameter.

11. The method of claim 10, wherein the circuit parameter comprises one or more of:
   a. circuit fluid velocity;
   b. circuit pressure drop;
   c. circuit length;
   d. circuit volume;
   e. circuit resistance, ΔP/flow rate; and
   f. combinations thereof.

12. The method of claim 10, wherein modifying each of the remaining circuits of the plurality of circuits comprises enlarging at least a portion of at least one of the plurality of circuits.

13. The method of claim 7, wherein the working fluid is at least partially circulated by a thermosiphon effect.

14. The method of claim 7, further comprising using at least a portion of the thermal energy to provide heating to a user.

15. The method of claim 7, further comprising generating electricity using at least a portion of the thermal energy.

16. The method of claim 9, wherein the circuit parameter comprises circuit fluid velocity and circuit length.

17. The method of claim 7, further comprising connecting the first wellbore and the second wellbore with the plurality of open hole circuits in a first out/last in configuration.

18. The method of claim 17, wherein flow across the plurality of open hole circuits is balanced.

* * * * *